(12) United States Patent
Ikushima et al.

(10) Patent No.: US 8,107,628 B2
(45) Date of Patent: Jan. 31, 2012

(54) DATA TRANSMITTING APPARATUS AND DATA RECEIVING APPARATUS

(75) Inventors: Tsuyoshi Ikushima, Nara (JP); Masaru Fuse, Osaka (JP); Satoshi Furusawa, Osaka (JP); Tomokazu Sada, Osaka (JP)

(73) Assignee: Panasonic Corporation, Osaka (JP)

( * ) Notice: Subject to any disclaimer, the term of this patent is extended or adjusted under 35 U.S.C. 154(b) by 918 days.

(21) Appl. No.: 12/127,210

(22) Filed: May 27, 2008

(65) Prior Publication Data

US 2009/0323955 A1  Dec. 31, 2009

(30) Foreign Application Priority Data

May 29, 2007 (JP) ................................. 2007-142229

(51) Int. Cl.
*H04L 29/06* (2006.01)
(52) U.S. Cl. .............. 380/268; 380/44; 380/45; 380/46; 380/47; 713/150
(58) Field of Classification Search .................... 380/268
See application file for complete search history.

(56) References Cited

U.S. PATENT DOCUMENTS 7,392,396 B2 * 6/2008 Fernando et al. ............. 713/184

2005/0210244 A1 * 9/2005 Stevens et al. ................ 713/166

FOREIGN PATENT DOCUMENTS

JP   2005-57313   3/2005

* cited by examiner

*Primary Examiner* — Kambiz Zand
*Assistant Examiner* — Imhotep Durham
(74) *Attorney, Agent, or Firm* — Wenderoth, Lind & Ponack, L.L.P.

(57) ABSTRACT

A data communication apparatus, performing a secret communication, is provided to reduce a random number generation speed using a plurality of random number generators. The data communication apparatus includes random number generation sections generating random numbers, which are each a multi-level pseudo random number, using predetermined key information includes a multi-level signal modulation section selecting a level, from among multi-levels previously prepared, selected level corresponding to information data and a multi-level sequence, which is composed of a combination of values of the random numbers and generating a multi-level modulated signal including a noise having a predetermined noise level using the selected level. Levels of a multi-level signal are in a range of the noise level, and a signal point allocation is set such that all values which are possibly taken by each of the random numbers are allocated to the plurality of levels of the multi-level signal.

19 Claims, 23 Drawing Sheets

FIG. 5

| RANDOM NUMBER | | | | | | a XOR f | a XOR e | a XOR d | a XOR c | a XOR b | a | MULTI-LEVEL CODE SEQUENCE (DECIMAL FORMAT) |
|---|---|---|---|---|---|---|---|---|---|---|---|---|
| a | b | c | d | e | f | | | | | | | |
| 1 | 1 | 1 | 1 | 1 | 1 | 0 | 0 | 0 | 0 | 0 | 1 | 1 |
| 0 | 1 | 1 | 1 | 1 | 1 | 1 | 1 | 1 | 1 | 1 | 0 | 62 |
| ... | ... | ... | ... | ... | ... | ... | ... | ... | ... | ... | ... | ... |
| 1 | 1 | 1 | 0 | 0 | 0 | 1 | 1 | 1 | 0 | 0 | 1 | 57 |
| 0 | 1 | 1 | 0 | 0 | 0 | 0 | 0 | 0 | 1 | 1 | 0 | 6 |
| 1 | 0 | 1 | 0 | 0 | 0 | 1 | 1 | 1 | 0 | 1 | 1 | 59 |
| 0 | 0 | 1 | 0 | 0 | 0 | 0 | 0 | 0 | 1 | 0 | 0 | 4 |
| 1 | 1 | 0 | 0 | 0 | 0 | 1 | 1 | 1 | 1 | 0 | 1 | 61 |
| 0 | 1 | 0 | 0 | 0 | 0 | 0 | 0 | 0 | 0 | 1 | 0 | 2 |
| 1 | 0 | 0 | 0 | 0 | 0 | 1 | 1 | 1 | 1 | 1 | 1 | 63 |
| 0 | 0 | 0 | 0 | 0 | 0 | 0 | 0 | 0 | 0 | 0 | 0 | 0 |

F I G. 9
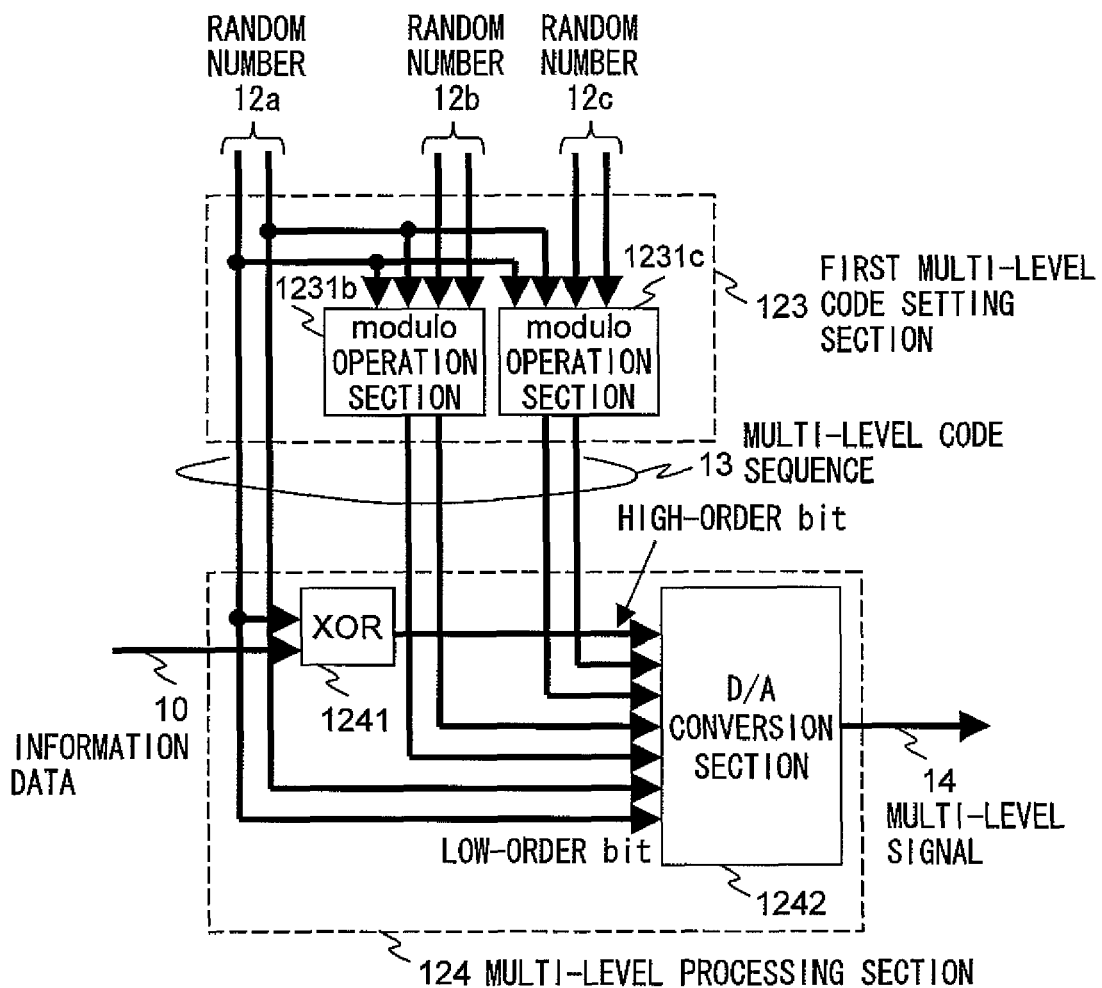

F I G. 1 0
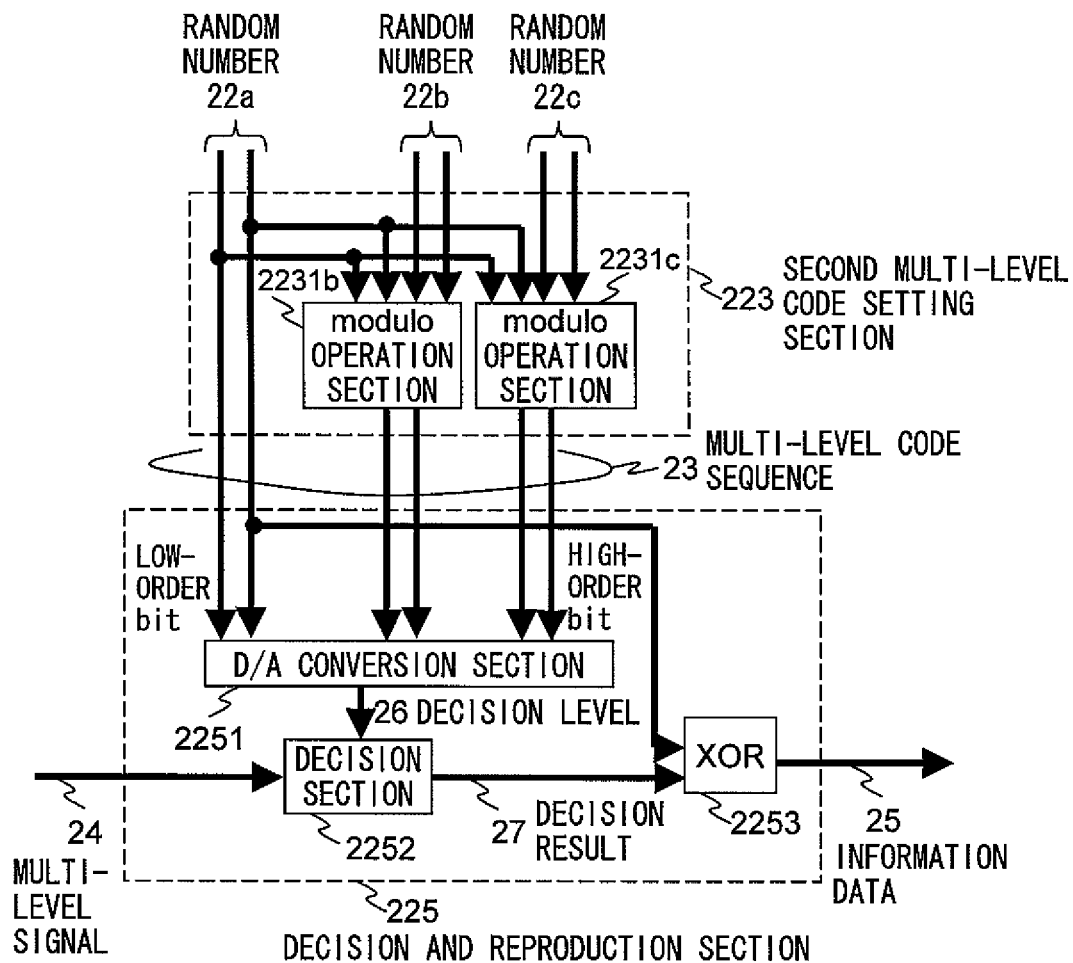

F I G. 1 1

| RANDOM NUMBER | | | (a+c) mod 4 | (a+b) mod 4 | MULTI-LEVEL CODE SEQUENCE | |
|---|---|---|---|---|---|---|
| c | b | a | | | | |
| 3 | 3 | 3 | 2 | 2 | 2×16+2×4+3= | 43 |
| 3 | 3 | 2 | 1 | 1 | 1×16+1×4+2= | 22 |
| . | . | . | . | . | | . |
| . | . | . | . | . | | . |
| . | . | . | . | . | | . |
| 0 | 1 | 3 | 3 | 0 | 3×16+0×4+3= | 51 |
| 0 | 1 | 2 | 2 | 3 | 2×16+3×4+2= | 46 |
| 0 | 1 | 1 | 1 | 2 | 1×16+2×4+1= | 25 |
| 0 | 1 | 0 | 0 | 1 | 0×16+1×4+0= | 4 |
| 0 | 0 | 3 | 3 | 3 | 3×16+3×4+3= | 63 |
| 0 | 0 | 2 | 2 | 2 | 2×16+2×4+2= | 42 |
| 0 | 0 | 1 | 1 | 1 | 1×16+1×4+1= | 21 |
| 0 | 0 | 0 | 0 | 0 | 0×16+0×4+0= | 0 |

F I G. 1 3
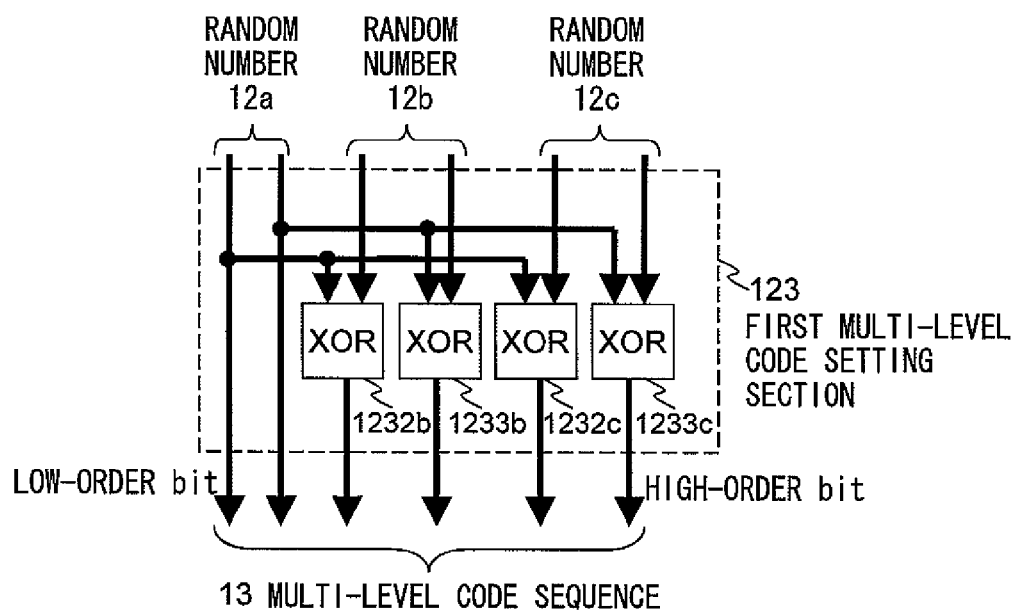

FIG. 14

| RANDOM NUMBER (BINARY FORMAT) | | | RANDOM NUMBER (DECIMAL FORMAT) | | | a XOR c | a XOR b | a | MULTI-LEVEL CODE SEQUENCE (DECIMAL FORMAT) |
|---|---|---|---|---|---|---|---|---|---|
| c | b | a | c | b | a | | | | |
| 1 | 1 | 1 | 3 | 3 | 3 | 0 | 0 | 1 | 3 |
| 1 | 1 | 0 | 3 | 3 | 2 | 0 | 0 | 1 | 23 |
| ... | ... | ... | ... | ... | ... | ... | ... | ... | ... |
| 0 | 1 | 1 | 0 | 1 | 3 | 1 | 1 | 0 | 58 |
| 0 | 1 | 0 | 0 | 1 | 2 | 1 | 1 | 1 | 47 |
| 0 | 1 | 1 | 0 | 1 | 1 | 0 | 0 | 0 | 17 |
| 0 | 0 | 0 | 0 | 0 | 0 | 0 | 0 | 0 | 4 |
| 0 | 0 | 1 | 0 | 0 | 3 | 1 | 1 | 1 | 62 |
| 0 | 0 | 0 | 0 | 0 | 2 | 0 | 0 | 0 | 43 |
| 0 | 0 | 1 | 0 | 0 | 1 | 1 | 1 | 1 | 21 |
| 0 | 0 | 0 | 0 | 0 | 0 | 0 | 0 | 0 | 0 |

※ RANDOM NUMBERS 12a TO 12c ARE DENOTED BY a TO c

F I G. 1 8 PRIOR ART

DATA TRANSMITTING APPARATUS AND DATA RECEIVING APPARATUS

BACKGROUND OF THE INVENTION

1. Field of the Invention

The present invention relates to an apparatus for performing cipher communication which avoids unauthorized eavesdropping and interception by a third party. More specifically, the present invention relates to a data transmitting apparatus and a data receiving apparatus which perform data communication between legitimate transmitting and receiving parties by selecting/setting a specific encoding/decoding (modulating/demodulating) method.

2. Description of the Background Art

Conventionally, in order to perform communication between specific parties, there has been adopted a configuration in which original information (hereinafter referred to as key information) is shared between transmitting and receiving ends so as to perform an arithmetic operation (encoding) and an inverse operation (decoding) on plain text, which is information data to be transferred, and then secret communication is realized.

On the other hand, there have been suggested, in recent years, several encryption methods, which positively utilize physical phenomenon occurring in a transmission line. As one of the encryption methods, there is a method called a Y-00 protocol for performing the secret communication by utilizing a quantum noise generated in the transmission line.

FIG. 17 is a diagram showing an example of a conventional transmitting and receiving apparatus using the Y-00 protocol disclosed in Japanese Laid-Open Patent Publication No. 2005-57313 (hereinafter referred to as Patent Document 1). Hereinafter, the configuration and an operation of the conventional transmitting and receiving apparatus disclosed in Patent Document 1 will be described. As shown in FIG. 17, the conventional transmitting and receiving apparatus includes a transmitting section 901, a receiving section 902 and a transmission line 910. The transmitting section 901 includes a first multi-level code generation section 911, a multi-level processing section 912 and a modulation section 913. The receiving section 902 includes a demodulation section 915, a second multi-level code generation section 914 and a decision section 916. The eavesdropper receiving section 903 is used by an intercepting party, and is not included in the conventional transmitting and receiving apparatus.

First, the transmitting section 901 and the receiving section 902 previously retain first key information 91 and second key information 96, respectively, which are key information identical in content to each other. Hereinafter, an operation of the transmitting section 901 will be described. In the transmitting section 901, the first multi-level code generation section 911 generates, by using the first key information 91, a multi-level code sequence 92, which is a multi-level pseudo random number series having M digits of values from "0" to "M−1" (M is an integer of 2 or more), by using a pseudo random number generator. The multi-level processing section 912 generates, based the information data 90 and the multi-level code sequence 92, which are to be transmitted to the receiving section 902, a multi-level signal 93 which is an intensity modulated signal, by using a signal format described hereinbelow.

FIG. 18 is a diagram showing the signal format used by the multi-level processing section 912. As shown in FIG. 18, in the case where the number of digits of values included in the multi-level code sequence 92 is M, a signal intensity thereof is divided into 2M signal intensity levels (hereinafter simply referred to as a level). That is, these levels are made into M pairs (hereinafter the pairs are referred to as bases), and to one level of each of the bases, a value "0" of the information data 90 is allocated, and, to the other level, a value "1" of the information data 90 is allocated. Generally, the allocation is made such that the levels corresponding to the value "0" of the information data 90 and the levels corresponding to the value "1" of the information data 90 are distributed evenly over the whole of the 2M levels. In FIG. 18, "0" is allocated to lower levels of even-numbered bases, and "1" is allocated to higher levels of the same. On the other hand, "1" is allocated to the lower levels of odd-numbered bases, and "0" is allocated to the higher levels of the same. Accordingly, the values "0" and "1" of the information data 90 are allocated alternately to each of the 2M levels.

The multi-level processing section 912 selects bases corresponding to the values of the multi-level code sequence 92 having been inputted, then selects one level of each of the bases, the one level corresponding to the value of the information data 90, and then outputs a multi-level signal 93 having the selected level. The modulation section 913 converts the multi-level signal 93 outputted by the multi-level processing section 912 into a modulated signal 94, which is an optical intensity modulated signal, and transmits the modulated signal 94 to the receiving section 902 via the transmission line 910. In Patent Document 1, the first multi-level code generation section 911 is described as a "transmitting pseudo random number generation section", the multi-level processing section 912 as a "modulation method specification section" and a "laser modulation driving section", the modulator section 913 as a "laser diode", the demodulator section 915 as a "photo-detector", the second multi-level code generation section 914 as a "receiving pseudo random number generation section", and the decision section 916 as a "determination circuit".

Next, an operation of the receiving section 902 will be described. In the receiving section 902, the demodulation section 915 converts the modulated signal 94 transmitted via the transmission line 910 from an optical signal to an electrical signal (hereinafter referred to as photoelectric conversion), and outputs a resultant signal as a multi-level signal 95. The second multi-level code generation section 914 generates, by using the second key information 96, a multi-level code sequence 97, which is a multi-level pseudo random number series equal to the multi-level code sequence 92. In accordance with respective digits of values of the multi-level code sequence 97 inputted by the second multi-level code generation section 914, the decision section 916 determines each of the bases used for generating the multi-level signal 95. The decision section 916 performs binary decision by using the decided bases and the multi-level signal 95 which is inputted by the demodulation section 915, and obtains information data 98 which is equal to the information data 90.

FIG. 19 is a diagram illustrating, in detail, an operation of a conventional transmitting apparatus. FIG. 20 is a diagram illustrating, in detail, an operation of a conventional receiving apparatus. Hereinafter, with reference to FIGS. 19 and 20, the operation of the conventional transmitting and receiving apparatuses in the case where the number of the digits of the values included in the multi-level code sequence 92 is 64 (M=64) will be described in detail. As indicated by (a) and (b) shown in FIG. 19, an exemplary case will be described where a value of the information data 90 changes "0, 1, 1, 1", and a value of the multi-level code sequence 92 changes "0, 63, 0, 1". In this case, a level of the multi-level signal 93 in the transmitting section 901 changes "0, 63, 64, 1", as shown in FIG. 19(c).

Specifically, at a time period t1 shown in FIG. 19(c), a 0th base (a pair of level 0 and level 64) corresponding to a value "0" of the multi-level code sequence 92 is selected. Next, level 0 of the 0th base corresponding to a value "0" of the information data 90 is selected, and the selected level 0 comes to a level of the multi-level signal 93 at the time period t1. In a similar manner, at a time period t2, a 63rd base (a pair of level 63 and level 127) corresponding to a value "63" of the multi-level code sequence 92 is selected. Next, level 63 of the 63rd base corresponding to the value "1" of the information data 90 is selected, and the selected level 63 comes to the level of the multi-level signal 93 at the time period t2. In a similar manner, the level of the multi-level signal 93 is selected in time periods t3 and t4. In this manner, at each of the time periods t1 and t3, in which the value of the multi-level code sequence 92 is even numbered, the lower level of the base corresponds to "0" of the information data, and the higher level of the base corresponds to the value "1" of the information data. On the other hand, at each of the time periods t2 and t4, in which the value of the multi-level code sequence 92 is odd numbered, the lower level of the base corresponds to "1" of the information data, and the higher level of the base corresponds to "0" of the information data.

The multi-level signal 95 inputted to the decision section 916 in the receiving section 902 is a signal which changes as shown in FIG. 20(e), and which includes a noise such as a shot noise generated at the time of the photoelectric conversion performed by the demodulation section 915. The decision section 916 selects the respective bases corresponding to the respective digits of values of the multi-level code sequence 97 (see FIG. 19(d)), which is equal to the multi-level code sequence 92, and sets an intermediate level of each of the bases as a decision level, as shown in FIG. 20(e). The decision section 916 then determines whether the multi-level signal 95 is higher or lower than the decision level.

Specifically, at a time period t1 shown in FIG. 20(e), the decision section 916 selects a 0th base (a pair of level 0 and level 64) corresponding to a value "0" of the multi-level code sequence 97, and sets an intermediate level 32 of the 0th base as the decision level. Since levels of multi-level signal 95 are generally distributed over lower levels than the decision level at the time period t1, the decision section 916 determines that the multi-level signal 95 is lower than the decision level. In a similar manner, at a time period t2, the decision section 916 selects a 63rd base (a pair of level 63 and level 127) corresponding to a value "63" of the multi-level code sequence 97, and sets an intermediate level 95 of the 63rd base as the decision level. Since the multi-level signal 95 is generally distributed over lower levels than the decision level at the time period t2, the decision section 916 decides that the multi-level signal 95 is lower than the decision level. At time periods t3 and t4 as well, decision is made in a similar manner. Accordingly, a result of the binary decision performed by the decision section 916 becomes "lower, lower, higher, lower".

In the case where the value of the multi-level code sequence 97 is even numbered (at the time periods t1 and t3), the decision section 916 decides that a lower level of the selected base is "0", and that a higher level thereof is "1", and then outputs the decided values as the information data 98. On the other hand, in the case where the value of the multi-level code sequence 97 is odd numbered (at the time periods t2 and t4), the decision section 916 decides that the lower level of the selected base is "1", and that the higher level thereof is "0", and then outputs the decided values as the information data 98. The values of the multi-level code sequence 97 are "0, 63, 0, 1", i.e., "even, odd, even, odd" (even representing an even number, and odd representing an odd number). Accordingly, the decision section 916 outputs "0, 1, 1, 1" as the information data 98, which is equal to the information data 90 (see FIG. 20(f)). In this manner, the decision section 916 can obtain the information data 98 from the multi-level signal 95 in which values of the information data to be allocated to the lower level and higher level of the base are changed depending on whether the respective values of the multi-level code sequence 97 are even-numbered or odd-numbered.

The above description of the conventional transmitting and receiving apparatuses does not illustrate, in detail, a processing method for obtaining the respective values of the information data 98 in accordance with whether the respective values of the multi-level code sequence 97 are even numbered or odd-numbered. A processing method described below is generally used. That is, first, the second multi-level code generation section 914 generates an inverted signal "0, 1, 0, 1". Note that the inverted signal is a binary signal, and is equivalent to lowest order bits of the respective values "0, 63, 0, 1" comprising the multi-level code sequence 97. The decision section 916 performs an exclusive OR operation (XOR operation) between a signal "0, 0, 1, 0", which represents "lower, lower, higher, lower" as a result of the above-described binary decision, and the inverted signal "0, 1, 0, 1", and then obtains, as a result of the operation, the information data 98 "0, 1, 1, 1".

As above described, in the case of using a signal format (see FIG. 18) in which the values of the information data to be allocated to the higher or the lower levels of the base are changed depending on whether the respective values of the multi-level code sequence 97 are even-numbered or odd-numbered, the decision section 916 uses the inverted signal so as to generate the information data 98. However, for example, in the case where the value "1" of the information data is always allocated to the higher level of the base and where the value "0" of the information data is always allocated to the lower level of the base, the decision section 916 does not need to use the inverted signal so as to generate the information data 98.

Further, as above described, the multi-level signal 95 includes the noise such as the shot noise which is generated through the photoelectric conversion performed by the demodulation section 915. However, intervals between the levels (hereinafter referred to as a step width) or the like are set appropriately, whereby a binary decision error may be suppressed to a negligible level.

Next, possible eavesdropping (including interception) will be described. As shown in FIG. 17, an eavesdropper attempts decryption of the information data 90 or the first key information 91 from the modulated signal 94 by using an eavesdropper receiving section 903, without having key information which is shared between the transmitting and receiving parties. The eavesdropper receiving section 903 includes a demodulation section 921, a multi-level decision section 922 and a decryption processing section 923, and is connected to the transmission line 910.

In the case where the eavesdropper performs the same binary decision as that performed by the legitimate receiving party (receiving section 902), the eavesdropper needs to attempt a decision of all possible values which are taken by the key information, since the eavesdropper does not have the key information. However, when this method is used, the number of attempts of the decision increases exponentially along with an increase in a length of the key information. Therefore, if the length of the key information is significantly long, the method is not practical.

A further effective method is assumed in which the eavesdropper performs multi-level decision of a multi-level signal 81 by using a multi-level decision section 922, the multi-level signal 81 having been obtained through the photoelectric conversion performed by the demodulation section 921, decrypts a resultant received sequence 82 by using decryption processing section 923, and then attempts the decryption of the information data 90 or the first key information 91. In the case of using the decryption method, if the eavesdropper receiving section 901 can receive (decide) the multi-level signal 93 as the received sequence 82 without mistake, it is possible to decrypt the first key information 91 from the received sequence 82 at a first attempt.

Since the shot noise, which is generated through the photoelectric conversion performed by the demodulation section 921, is overlapped on the modulated signal 94, the shot noise is included in the multi-level signal 81. It is known that the shot noise is inevitably generated in accordance with the principle of quantum mechanics. Accordingly, if the step width of the multi-level signal 93 is set significantly smaller than a distribution width of the shot noise, the multi-level signal 81 including the noise may be distributed over various levels other than a correct level (the level of the multi-level signal 93). For example, as shown in FIG. 20(g), at the time period t3, the multi-level signal 81 is distributed over levels 63 to 65. Accordingly, the eavesdropper needs to perform decryption while considering a possibility (a possibility of a decision error) that the level of the received sequence 82 obtained through the decision is different from the correct level. Therefore, compared to a case without the decision error (a stream cipher which applies the same random number generator as that used in the first multi-level code generation section 911), the number of the attempts, that is, the computational complexity required for the decryption is increased. As a result, security against the eavesdropping improves.

As above described, in the Y-00 protocol, a distance between signal points to be decided by the legitimate receiving party and the distance between the signal points to be decided by the eavesdropper are set different from each other, whereby receiving performance of the legitimate receiving party and the security against the eavesdropping can be both ensured. The difference between the distances between the signal points are determined by the number of multi-levels of the multi-level code sequence 92. That is, when the number of the multi-levels of the multi-level code sequence 92 increases, the difference between the distance between the signal points for the legitimate receiving party and that for the eavesdropper becomes larger, whereby security is further ensured.

As shown in FIG. 21, it is possible to provide a random number generator 9111 and a S/P conversion section 9112 to both of the first multi-level code generation section 911 and the second multi-level code generation section 914. That is, the S/P conversion section 9112 performs a serial/parallel (S/P) conversion of a binary signal outputted from the random number generator 9111. However, in such configuration, when the number of the multi-levels of the multi-level code sequence 92 increases, an operation speed of the random number generator 9111 needs to be improved. For example, in the case of an example shown in FIG. 19, the number of the multi-levels of the multi-level code sequence 92 is 64, which is equivalent to 6 bits if the number 64 is converted into a parallel signal form. In this case, the operation speed of the random number generator 9111 needs to be six times as fast as a transmission rate of the information data 90. When the number of the multi-levels of the multi-level code sequence 92 increases, a difference between the operation speed of the random number generator 9111 and the transmission rate increases further.

On the other hand, as shown in FIG. 22, there may be considered a configuration in which, as a multi-level code generation section 911x, a plurality of random number generators 9113a to 9113f are arranged in parallel, and respective random numbers 97a to 97f, which are outputted there from, are caused to correspond to respective orders of the bits of the multi-level code sequence 92. In the configuration, the operation speed of each of the random number generators can be the same as the data rate.

Correspondences between the levels of the multi-level signal and the random numbers 97a to 97f, in this case, are as shown in FIG. 23. Suppose that a noise level is twice as wide as the step width and that the eavesdropper has received a level "1" of the multi-level signal. In this case, a correct value of the level of the multi-level signal having been transmitted is likely to take three patterns from "0" to "2" (hereinafter a range of levels which possibly includes the correct value of the level of the transmitted multi-level signal is referred to as a "a multi-level decision error range"). Here, values of the random numbers 97a and 97b which correspond to low-order bits of the multi-level code sequence 92 and which are to be obtained in the multi-level decision error range are likely to be both of "0" and "1". That is, the eavesdropper is likely to obtain the values of the random numbers 97a and 97b wrongly. On the other hand, values of the random numbers 97c to 97f which correspond to high-order bits of the multi-level code sequence 92 and which are to be obtained in the multi-level decision error range are always "0", respectively, and thus, the eavesdropper can understand the respective values uniquely. That is, the eavesdropper can specify the values of the random numbers 97c to 97f.

If the values of the high-order bits of the multi-level code sequence can be identified, the decision level used in the decision section 916 can be identified almost accurately. That is, the eavesdropper can use the same receiving method as that used by the legitimate receiving party, and thus the security cannot be ensured. Therefore, the multi-level code generation section 911x having the configuration shown in FIG. 22 cannot be used.

In this manner, the conventional communication apparatus using the Y-00 protocol has a problem in that a reduction in the operation speed of the random number generator and the security cannot be ensured concurrently.

SUMMARY OF THE INVENTION

Therefore, an object of the present invention is to solve the above-described problems, and to provide a data transmitting apparatus and a data receiving apparatus which is capable of reducing an operation speed of a random number generator and which is also capable of ensuring security.

The present invention is directed to a data transmitting apparatus for multi-leveling information data by using predetermined key information and for performing secret communication with a receiving apparatus. In order to attain the above-described object, the data transmitting apparatus of the present invention comprises: a plurality of random number generation sections for respectively generating random numbers, which are each a multi-level pseudo random number, by using the predetermined key information; and a multi-level signal modulation section for selecting a level, from among multi-levels previously prepared, the level corresponding to the information data and a multi-level sequence, which is composed of a combination of values of the random numbers generated by the plurality of random number generation sections, and for generating, by using the selected level, a multi-level modulated signal including a noise having a predetermined noise level. A plurality of levels of the multi-level modulated signal is in a predetermined range of an amplitude or an intensity, and a plurality of the multi-level sequences corresponding to the plurality of levels includes, as values composing respective digits thereof, all the values of the respective random numbers generated by the plurality of random number generation sections.

Preferably, the number of multi-levels of each of the random numbers outputted from each of the plurality of random number generation sections is equal to one another, and a plurality of levels of the multi-level modulated signal, the number of the plurality of levels being equal to the number of the multi-levels of each of the random numbers, are in the predetermined range.

Preferably, the predetermined noise level is at least twice as large as a maximum difference between farthest two of the levels of the multi-level modulated signal in the predetermined range of the amplitude or the intensity.

The number of the multi-levels of each of the random numbers outputted from the plurality of random number generation sections is two. Adjoining two levels of the modulated signal are in the predetermined range of the amplitude or the intensity. Two levels of the multi-level sequences which correspond to the adjoining two levels of the modulated signal may be composed of values of each of the random numbers outputted from the plurality of random number generation sections, the values being different from each other.

Preferably, the multi-level signal modulation section includes: a multi-level code setting section for generating a multi-level code sequence in accordance with the multi-level sequence and in accordance with a predetermined rule; a multi-level processing section for generating a multi-level signal in accordance with the multi-level code sequence and the information data; and a modulation section for converting the multi-level signal into a multi-level modulated signal.

Further, the multi-level signal modulation section may include a noise adding section for generating a random noise and for adding the random noise to the multi-level signal or to the multi-level modulated signal.

Preferably, the number of the multi-levels of each of the random numbers, which are a first to an Nth random numbers, outputted from the plurality of the random number generation sections is $2^m$. The multi-level code sequence is a parallel signal. The multi-level code setting section includes a plurality of operation sections for performing predetermined operations between each combination of the first random number and the second to the Nth random numbers. In this case, the multi-level code setting section outputs the first random number as a low-order m bit of the multi-level code sequence, and also outputs resultants of the predetermined operations performed by the plurality of operation sections as a high-order bit of the multi-level code sequence.

As the predetermined operations performed by the plurality of operation sections, an operation may be applied in which an addition or a subtraction is performed between two of the random numbers, and a resultant of the addition or the subtraction is divided by $2^m$ so as to obtain a remainder thereof.

Alternatively, the predetermined operations performed by the plurality of operation sections may be XOR operations between respective bits of one of the random numbers and respective bits of another one of the random numbers.

Alternatively, the number of the multi-levels of each of the random numbers respectively outputted from the plurality of random number generation sections is two, and the predetermined operations performed by the plurality of operation sections may be XOR operations between two of the random numbers.

Further the multi-level code setting section may be configured with a conversion table in which relations between the plurality of random numbers and the multi-level code sequence are recorded.

The present invention is also directed to a data receiving apparatus for reproducing information data from a received modulated signal by using predetermined key information and performing secret communication with a transmitting apparatus. In order to attain the above-described object, the data receiving apparatus of the present invention comprises: a plurality of random number generation sections for respectively generating random numbers, which are each a multi-level pseudo random number, by using the predetermined key information; and a signal demodulation and reproduction section for demodulating and reproducing the information data in accordance with the received modulated signal and one or more multi-level sequences which are each composed of a combination of values of the random numbers generated by the plurality of random number generation sections. a plurality of levels of the modulated signal is in a predetermined range of an amplitude or an intensity, and the multi-level sequences corresponding to the plurality of levels include, as values composing respective digits thereof, all the values of the random numbers generated by the plurality of the random number generation sections.

Preferably, the signal demodulation and reproduction section includes: a demodulation section for demodulating the modulated signal and outputting a multi-level signal; a multi-level code setting section for generating a multi-level code sequence in accordance with the plurality of random numbers and also in accordance with a predetermined rule; and a decision and reproduction section for performing a binary decision of the multi-level signal by using the multi-level code sequence as a decision level, and for reproducing the information data.

Preferably, the number of multi-levels of each of the random numbers, which are a first to an Nth random numbers, outputted from the plurality of random number generation sections is $2^m$. The multi-level code sequence is a parallel signal. The multi-level code setting section may include a plurality of operation sections for performing predetermined operations between each combination of the first random number and the second to the Nth random numbers. In this case, the multi-level code setting section outputs the first random number as a low-order m bit of the multi-level code sequence, and also outputs a resultant of the predetermined operations performed by the plurality of operation sections as a high-order bit of the multi-level code sequence.

As the predetermined operations performed by the plurality of operation sections, an operation in may be applied in which an addition or a subtraction are performed between two of the random numbers, and a resultant of the addition or the subtraction is divided by $2^m$ so as to obtain a remainder thereof.

Alternatively, the predetermined operations performed by the plurality of operation sections may be XOR operations between respective bits of one of the random numbers and respective bits of another one of the random numbers.

Alternatively, the number of the multi-levels of each of the random numbers respectively generated by the plurality of random number generation sections is two, and the predetermined operations performed by the plurality of operation sections may be XOR operations between two of the random numbers.

Further, the multi-level code setting section may be configured with a conversion table in which relations between the plurality of random numbers and the multi-level code sequence are recorded.

The present invention is also directed to a data communication method performing secret communication between a transmitting apparatus and a receiving apparatus by using predetermined key information. In order to attained the above-described object, the data communication method comprises, in the transmitting apparatus, the steps of: generating a plurality of random numbers, which are each a multi-level pseudo random number, by using the predetermined key information; and selecting a level, from among multi-levels previously prepared, the level corresponding to information data and a multi-level sequence, which is composed of a combination of values of the plurality of random numbers, and generating, by using the selected level, and transmitting a multi-level modulated signal including a noise having a predetermined noise level. The data communication method also comprises, in the receiving apparatus, the steps of: generating a plurality of random numbers, which are each a multi-level pseudo random number, by using the predetermined key information; and demodulating and reproducing the information data in accordance with the received modulated signal and a multi-level sequence which is composed of the combination of the values of the plurality of random numbers. A plurality of levels of the multi-level modulated signal is in a predetermined range of an amplitude or an intensity, and the multi-level sequences corresponding to the plurality of levels include, as values comprising respective digits thereof, all the values of the random numbers respectively generated by the plurality of random number generation sections.

According to the data transmitting apparatus and the data receiving apparatus of the present invention, even in the case where the multi-level signal is generated by using the plurality of random numbers, the eavesdropper cannot identify the values of the respective random numbers in accordance with the multi-level decision result. Therefore, the security can be ensured while a plurality of relatively low-speed random number generation sections is used.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a chart illustrating relations of inputs/outputs to/from the multi-level code setting section shown in each of FIGS. 3 and 4;

FIG. 9 is a block diagram showing an exemplary configuration of a first multi-level code setting section 123 and a multi-level processing section 124 according to the second embodiment of the present invention;

FIG. 10 is a block diagram showing an exemplary configuration of a second multi-level code setting section 223 and a decision and reproduction section 225 according to the second embodiment of the present invention;

FIG. 11 is a chart illustrating relations of inputs/outputs to/from the multi-level code setting section shown in each of FIGS. 9 and 10;

FIG. 13 is a block diagram showing another exemplary configuration of the first multi-level code setting section 123 according to the second embodiment of the present invention;

FIG. 14 is a chart illustrating relations of inputs/outputs to/from the multi-level code setting section shown in FIG. 13;

DESCRIPTION OF THE PREFERRED EMBODIMENTS

Hereinafter, respective embodiments of the present invention will be described with reference to diagrams.

First Embodiment

Figure 1:
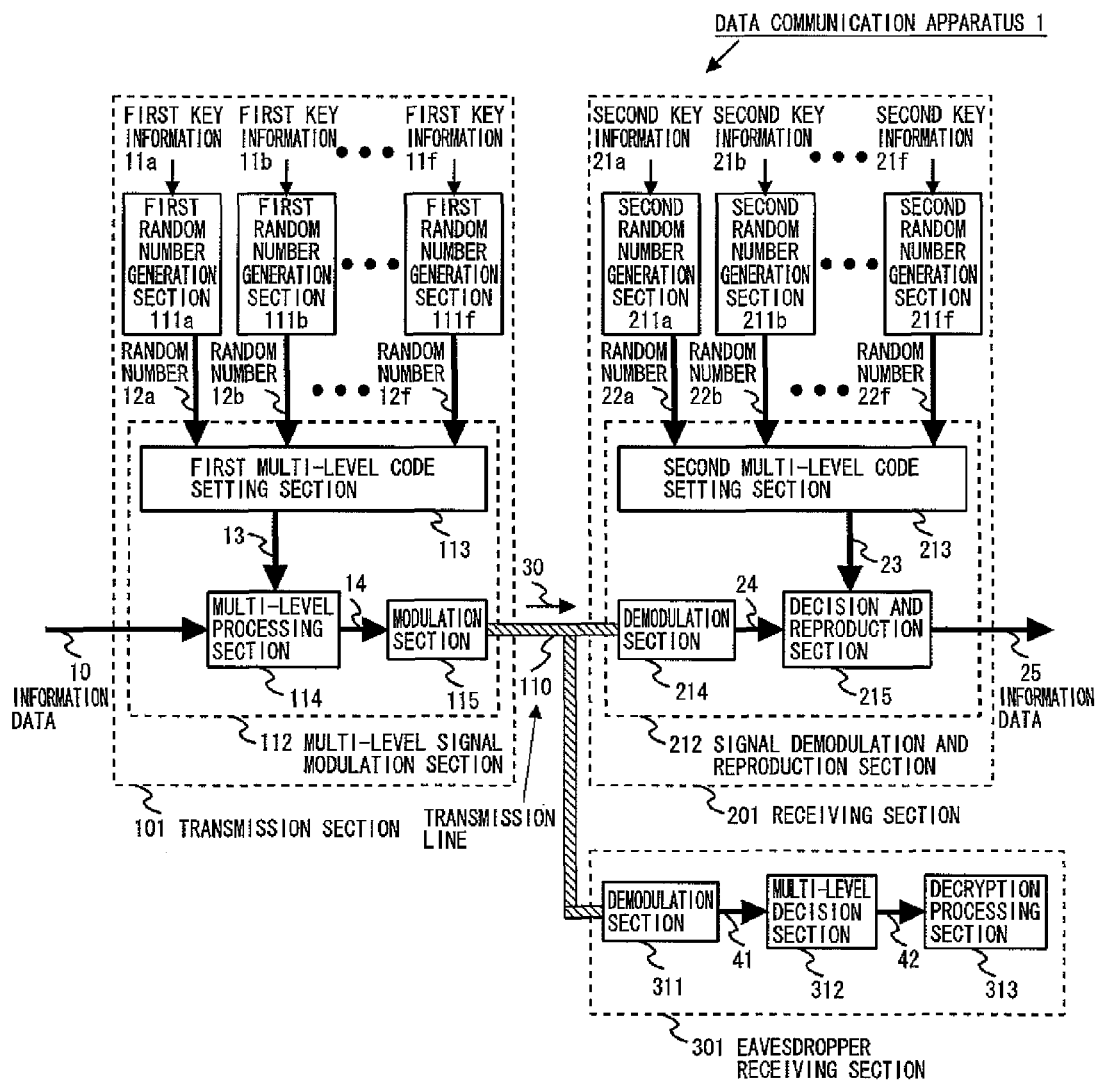
FIG. 1 is a block diagram showing a configuration of a data communication apparatus 1 according to a first embodiment of the present invention.

FIG. 1 is a block diagram showing a configuration of a data communication apparatus 1 according to a first embodiment of the present invention. As shown in FIG. 1, the data communication apparatus 1 has a configuration in which a data transmitting apparatus (hereinafter referred to as a transmitting section) 101, and a data receiving apparatus (herein after referred to as a receiving section) 201 are connected to each other via the transmission line 110. The transmitting section 101 includes first random number generation sections 111a to 111f, a first multi-level code setting section 113, a multi-level processing section 114 and a modulation section 115. The receiving section 201 includes second random number generation sections 211a to 211f, a second multi-level code setting section 213, a demodulation section 214 and a decision and reproduction section 215. As the transmission line 110, an optical waveguide such as an optical-fiber cable, or a metal line such as a LAN cable or a coaxial line may be used. Further, the transmission line 110 is not limited to a wired cable such as the LAN cable, but can be free space which enables a wireless signal to be transmitted. Still further, the eavesdropper receiving section 301 is an apparatus used by an eavesdropper, and is not included in the data communication apparatus 1.

First, the transmitting section 101 and the receiving section 201 previously retain first key information 11a to 11f and second key information 21a to 21f, respectively, which are identical in content to each other. That is, the first key information 11a to 11f and the second key information 21a to 21f are comprised of the same number of digits of bits. In addition, the first key information 11a is identical to the second key information 21a, the first key information 11b is identical to the second key information 21b, etc. for c, d, e . . . , and the first key information 11f is identical to the second key information 21f likewise.

Hereinafter, an operation of the transmitting section 101 will be described, first. In the transmitting section 101, the first random number generation sections 111a to 111f use first key information 11a to 11f as initial values, respectively, and outputs random numbers 12a to 12f, which are each a binary pseudo random number. The first multi-level code setting section 113 generates and outputs a multi-level code sequence 13 by using values of the inputted random numbers 12a to 12f in accordance with a predetermined rule. The multi-level processing section 114 selects bases corresponding to values of the multi-level code sequence 13 having been inputted, selects one level from each of the bases, the one level corresponding to a value of information data 10 having been inputted, and then outputs the multi-level signal 14 having the selected one levels. The modulation section 115 modulates the multi-level signal 14 inputted thereto in a predetermined modulation form, and outputs a resultant signal to the transmission line 110 as a modulated signal 30.

Next, an operation of the receiving section 201 will be described. In the receiving section 201, the demodulation section 214 demodulates the modulated signal 30 transmitted via the transmission line 110, and outputs a resultant signal as a multi-level signal 24. The second random number generation sections 211a to 211f use second key information 21a to 21f as initial values thereof, and outputs random numbers 22a to 22f, which are each a binary pseudo random number. The second multi-level code setting section 213 generates a multi-level code sequence 23 by using the values of the random numbers 22a to 22f inputted thereto in accordance with a rule shared with the first multi-level code setting section 113. The decision and reproduction section 215 determines bases corresponding to respective values of a multi-level code sequence 17 inputted from the second multi-level code generation section 212. The decision section 216 performs binary decision by using the determined bases (pairs of levels) and the multi-level signal 24 inputted from the demodulation section 214, and reproduces information data 25 from a signal obtained from the binary decision.

In the transmitting section 101, the first multi-level code setting section 113, the multi-level processing section 114, and the modulation section 115 may be collectively configured as a multi-level signal modulation section 112. Further, in the receiving section 201, the second multi-level code setting section 213, the demodulation section 214 and the decision and reproduction section 215 may be collectively configured as a signal demodulation and reproduction section 212.

Figure 2:
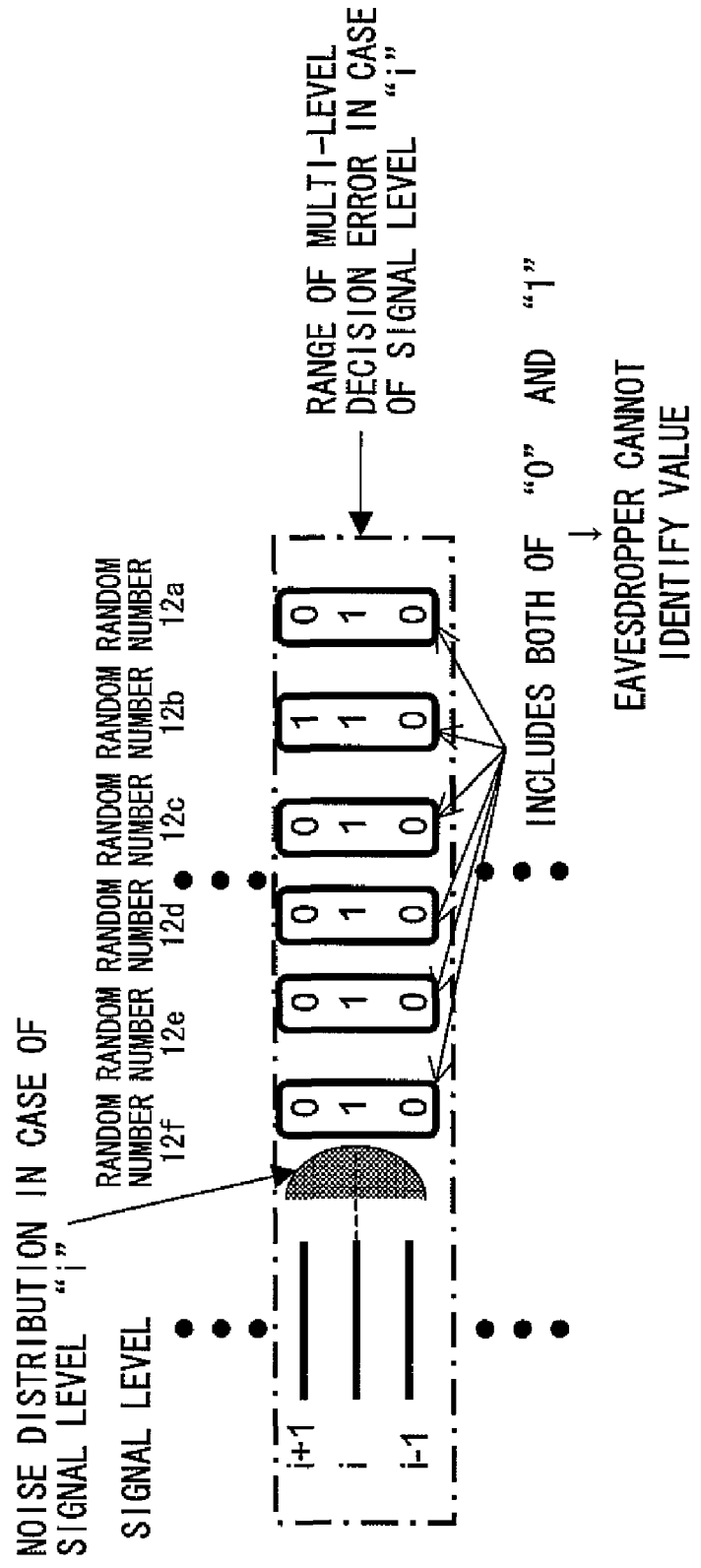
FIG. 2 is a schematic diagram showing a signal point allocation according to the first embodiment of the present invention.

Next, with reference to a schematic diagram shown in FIG. 2, relations between the levels of the multi-level signal and the random numbers 12a to 12f in the present embodiment will be described. FIG. 2 shows 3 levels extracted from the levels of the multi-level signal. Among the extracted levels, an intermediate signal level is set as a signal level "i". With the signal level "i" situated at a central portion of the extracted levels, a case will be supposed where noise level is distributed over the 3 levels from "i−1" to "i+1". In this case, if a signal level which is obtained by the eavesdropper through a multi-level decision performed by the multi-level decision section 312 is "i", a correct transmission signal may be any one of 3 levels ranging from "i−1" to "i+1". That is, a range a multi-level decision error possibly made by the eavesdropper is a range indicated by chain lines shown in the diagram. In the case where the random number 12a allocated to the signal levels "i−1" to "i+1", include both of the values "0" and "1", the eavesdropper cannot identify the value of the random number 12a used by the transmitting party. In a similar manner, with respect the random numbers 12b to 12f as well, in the case where the values of the random numbers 12b to 12f corresponding to the signal levels "i−1" to "i+1" respectively include both of the values "0" and "1", the eavesdropper cannot identify the values used by the transmitting party. In this manner, in the case where a signal point allocation is made such that, in the range of the multi-level decision error, the respective random numbers allocated to the signal levels include both of the values "0" and "1", the eavesdropper cannot identify the values of the respective random numbers used by the transmitting party. Accordingly, security can be ensured. In the present embodiment, regardless of the signal levels received by the eavesdropper, the signal point allocation satisfying the above-described condition will be applied.

Figure 3:
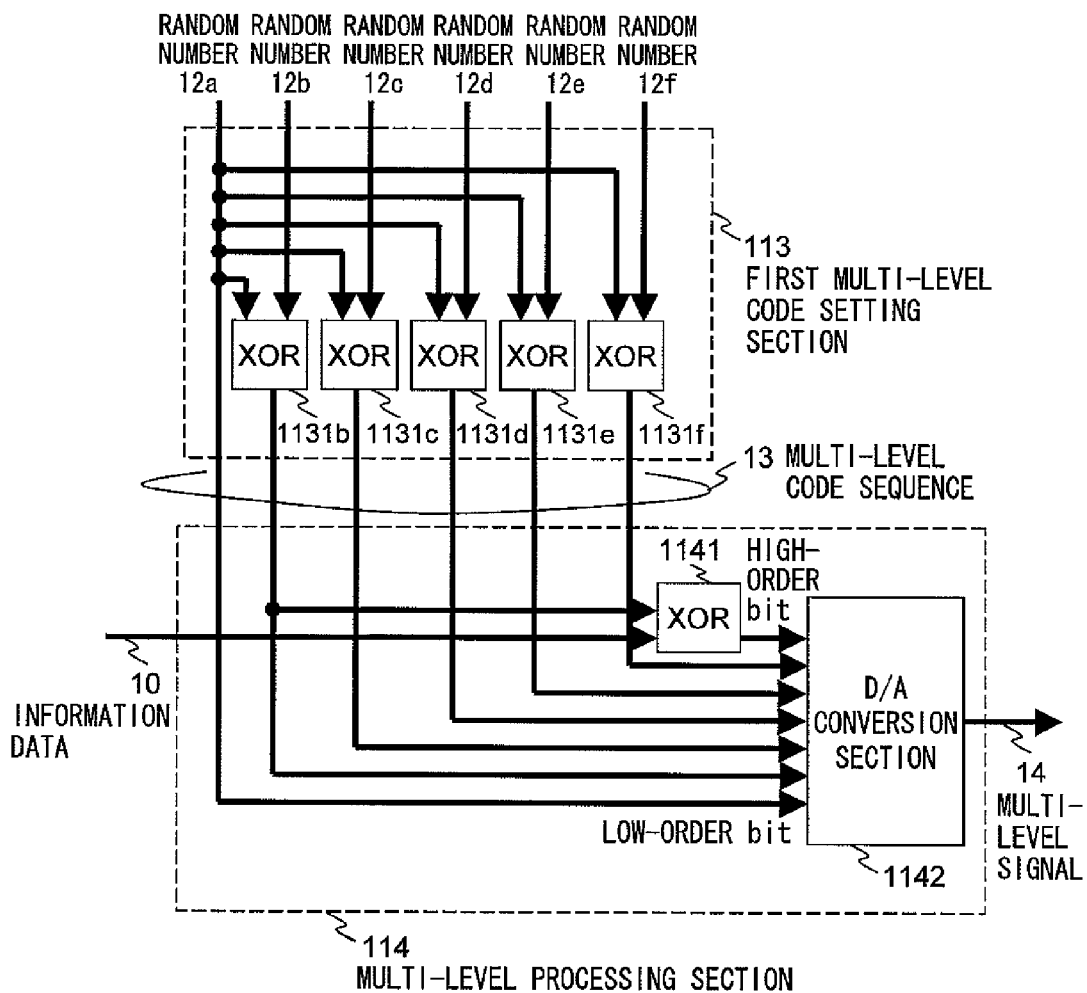
FIG. 3 is a block diagram showing an exemplary configuration of a first multi-level code setting section 113 and a multi-level processing section 114 according to the first embodiment of the present invention.

A specific example for realizing this signal point allocation will be described hereinbelow in detail. FIG. 3 is a diagram showing an exemplary configuration of the first multi-level code setting section 113 and the multi-level processing section 114. As shown in FIG. 3, the first multi-level code setting section 113 includes XOR operation sections 1131b to 1131f. The XOR operation section 1131b performs an XOR between the random number 12b and the random number 12a, and outputs a resultant of the operation. The XOR operation section 1131c performs the XOR operation between the random number 12c and the random number 12a, and outputs a resultant of the operation. In a similar manner, the XOR operation sections 1131d to 1131f perform the XOR operations between the random numbers 12d to 12f and the random number 12a, respectively, and output resultants of the operations, respectively. The random number 12a is outputted from the first multi-level code setting section 113 in situ as a lowest-order bit of the multi-level code sequence 13, and the resultants of the operations are outputted as remaining order bits of the multi-level code sequence 13 from the XOR operation sections 1131b to 1131f.

The multi-level processing section 114 includes an XOR operation section 1141 and a D/A conversion section 1142. The information data 10 and one bit of multi-level code sequence 13 are inputted to the XOR operation section 1141, and are subject to the XOR operation therebetween. A resultant of the XOR operation is then outputted. The one bit of the multi-level code sequence 13 to be inputted to the XOR operation section 1141 can be determined arbitrarily. Preferably, as low-order a bit as possible other than the bit outputted in situ from the random number 12a (the lowest-order bit) is to be inputted. The reason why the bit other than the bit outputted in situ from the random number 12a is to be inputted will be described below. The eavesdropper can easily identify a value of the highest-order bit inputted to the D/A conversion section 1142 in accordance with the modulated signal 30. Further, when the eavesdropper performs a known-plain text attack (an attack which attempts to identify key information by fixing a value of the information data), the value of the highest-order bit will be the same as a value inputted to the XOR operation section 1141, except for the value of the information data, or will be equivalent to an inverted value of the value inputted to the XOR operation section 1141. Therefore, when the bit outputted in situ from the random number 12a is inputted to the XOR operation section 1141, the eavesdropper will likely to identify the value of the random number 12a uniquely. Therefore, the bit other than the highest order bit is to be inputted to the XOR operation section 1141.

Further, the reason why as low-order bit as possible is to be inputted will be described below. The low-order bit of the multi-level code sequence 13 is likely to be identified erroneously due to effects of noises even if the eavesdropper attempts identification of the value thereof. On the other hand, the high-order bit is less likely to be identified erroneously. Further, when the eavesdropper identifies the one bit of the multi-level code sequence 13 to be inputted to the XOR operation section 1141, the eavesdropper can immediately understand the value of the information data 10. Therefore, it is preferable that the low-order bit, which is highly likely to be identified erroneously, is to be inputted. According to an example shown in FIG. 3, a second lowest-order bit is inputted to the XOR operation section 1141.

The bit outputted from the XOR operation section 1141 is inputted to the D/A conversion section 1142 as a highest order bit, and the bits comprising the multi-level code sequence 13 are inputted thereto as remaining order bits. The D/A conversion section 1142 performs a D/A conversion of the inputted bits, and outputs a resultant thereof as the multi-level signal 14.

Figure 4:
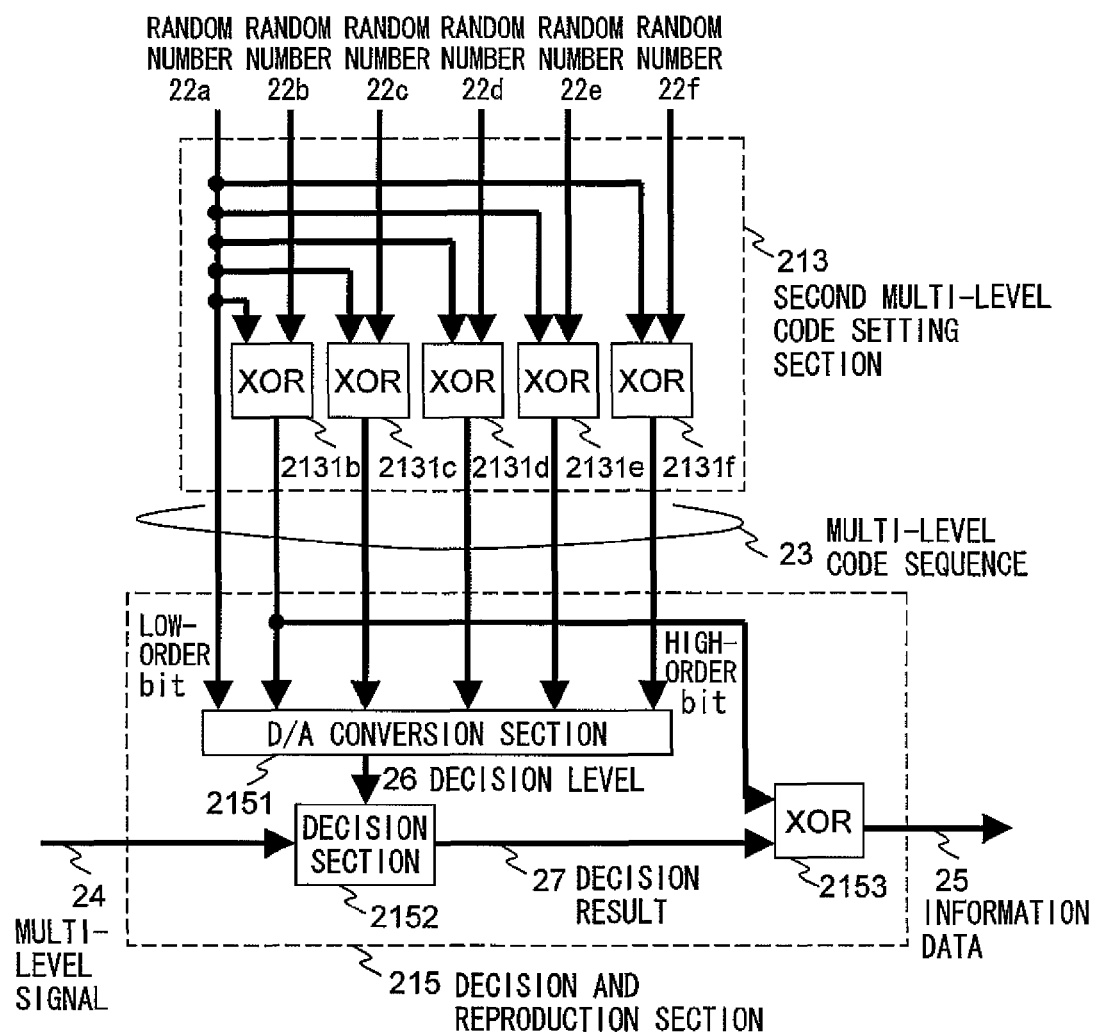
FIG. 4 is a block diagram showing an exemplary configuration of a second multi-level code setting section 213 and a decision and reproduction section 215 according to the first embodiment of the present invention.

FIG. 4 is a diagram showing an exemplary configuration of the second multi-level code setting section 213 and the decision and reproduction section 215. As shown in FIG. 4, the second multi-level code setting section 213 includes XOR operation sections 2131b to 2131f. Since the second multi-level code setting section 213 has the same function as the first multi-level code setting section 113, description thereof will be omitted. The decision and reproduction section 215 includes a D/A conversion section 2151, a decision section 2152 and an XOR operation section 2153. The D/A conversion section 2151 performs the D/A conversion on the multi-level code sequence 23 inputted thereto, and outputs a resultant thereof as a decision level 26. The decision section 2152 performs the binary decision of the multi-level signal 24 inputted thereto in accordance with the decision level 26, and outputs a resultant thereof as a decision result 27. The decision result 27 and one bit of the multi-level code sequence 23 are inputted to the XOR operation section 2153, and are subject to the XOR operation. A resultant of the XOR operation is then outputted as information data 25. The one bit of the multi-level code sequence 23 to be inputted to the XOR operation section 2153 is selected so as to be identical to the bit inputted to the XOR operation section 1141.

Next, inputs/outputs to/from the multi-level code setting section shown in FIGS. 3 and 4 will be tabulated in FIG. 5. In the table, the random numbers 12a to 12f are denoted by a to f. When values of the random numbers 12f, 12e, 12d, 12c, 12b and 12a are "0, 0, 0, 0, 0, 0", respectively, resultants of the XOR operations between the random number 12a and the respective values of the random number 12f, 12e, 12d, 12c and 12b come to "0, 0, 0, 0, 0". The value of the random number 12a is added in situ to the resultants, as the lowest-order bit, whereby the multi-level code sequence 13 is obtained, and a value of the multi-level code sequence 13 is represented by "0" in a decimal format. In a similar manner, when the values of the random number 12f, 12e, 12d, 12c, 12b and 12a are "0, 0, 0, 0, 0, 1", respectively, the resultants of the XOR operations will be "1, 1, 1, 1, 1", and the value of the multi-level code sequence 13 will be "63" in the decimal format. In the case of other values, relations between the random numbers 12a to 12f and the multi-level code sequence 13 are set in a similar manner.

Figure 6:
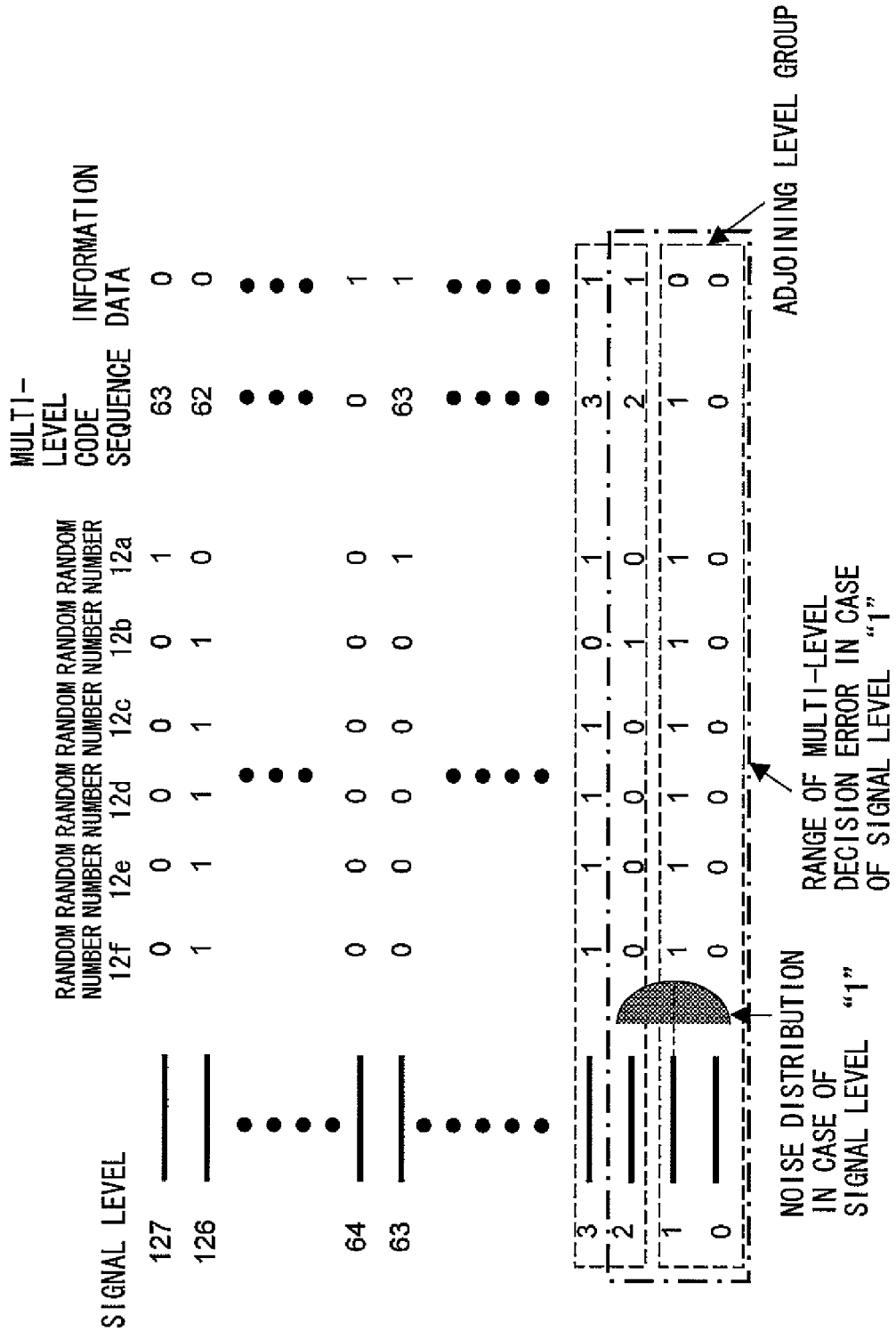
FIG. 6 is a diagram showing a specific example of the signal point allocation according to the first embodiment of the present invention.

With reference to FIG. 6, the signal point allocation in the case where the configurations shown in FIGS. 3 and 4 are used will be described. FIG. 6 shows relations between the levels of the multi-level signal, and the values of the random numbers 12a to 12f, the multi-level code sequence 13 and the information data 10 which correspond to the respective levels of the multi-level signal. The levels of the multi-level signal are divided into groups each comprised of adjoining two levels (indicated by dashed lines in the diagram, and hereinafter referred to as adjoining level groups). The values of the random numbers 12a to 12f are allocated to two levels of each of the adjoining level groups such that the values of each of the random numbers 12a to 12f allocated to the two levels are different from each other. Suppose a case where the noise level is distributed over 3 levels, that is, a case where the multi-level decision error (indicated by chain lines in the diagram) ranges over the 3 levels. In this case, one of the adjoining level groups is inevitably included in the range of the multi-level decision error. Therefore, the values of the random number 12a allocated to the signal levels in the range of the multi-level decision error inevitably include both of the values "0" and "1". In a similar manner, the values of the random numbers 12b to 12f allocated to the signal levels in the range of the multi-level decision error inevitably includes both of the values "0" and "1". Therefore, the signal point allocation in the schematic diagram shown in FIG. 2 can be realized, and accordingly, the eavesdropper cannot identify the values of the random numbers 12a to 12f, whereby the security can be ensured.

The security in the above-described exemplary configuration can be alternatively described as follows. That is, the eavesdropper cannot identify the adjoining levels of the multi-level signal due to the effects of the noise. Therefore, the eavesdropper cannot identify the value of the random number 12a which corresponds to the lowest-order bit of the level of the multi-level signal (to be inputted to the D/A conversion section 1142). On the other hand, the eavesdropper can distinguish the levels of the multi-level signal, the levels being relatively far from each other, and thus can correctly identify the high-order bits inputted to the D/A conversion section 1142. However, in order to identify the values of the random numbers 12b to 12f, the eavesdropper needs to identify the value of the random number 12a as well as the values of the high-order bits inputted to the D/A conversion section 1142. Since the value of the random number 12a is not known, the values of the random numbers 12b to 12f cannot be identified. That is, the eavesdropper cannot identify any values of the random numbers, and thus the security can be ensured.

In the above description is exemplified by the case where the noise level is distributed over the 3 levels. However, the noise levels may be distributed over a range of 4 levels or more as long as the range of levels is receivable by the legitimate receiving party. Further, the above description is exemplified by the case where the number of the random numbers is 6, that is, the number of the multi-levels of the multi-level code sequence 13 is 64. However the case is merely an example, and it is understood that the number of the random numbers (or the multi-levels) can be set arbitrarily as long as the above-described condition of the noise level is satisfied.

The configurations shown in FIGS. 3 and 4, and the signal point allocation shown in FIG. 6 are merely examples. Other configurations and signal point allocations may be applicable, as long as such configurations and such signal point allocations satisfy the condition illustrated in the schematic diagram shown in FIG. 2, that is, the condition that the values of the random numbers allocated to the levels of the multi-level signal in the range of the multi-level decision error include both of the values "0" and "1", respectively. For example, there may be adopted a configuration in which the relations between the random numbers and the multi-level code sequence, or the relations among the random numbers, the information data and the levels of the multi-level signal are set in accordance with a conversion table. Alternatively, respective component parts shown in FIG. 1 are not necessarily realized by hardware. Instead, functions of the component parts may be realized by software processing. As long as the condition illustrated in the schematic diagram shown in FIG. 2 is satisfied, intervals between the levels of the multi-level signal may be uneven, or some of the levels of the multi-level signal may be overlapped with each other.

As above described, according to the present embodiment, even in the case where the multi-level signal is generated by using a plurality of the random numbers, the eavesdropper cannot identify the values of the each of the random numbers in accordance with the result of the multi-level decision. Therefore, the security can be ensured with the use of a plurality of relatively low-speed random number generation sections.

Second Embodiment

Figure 7:
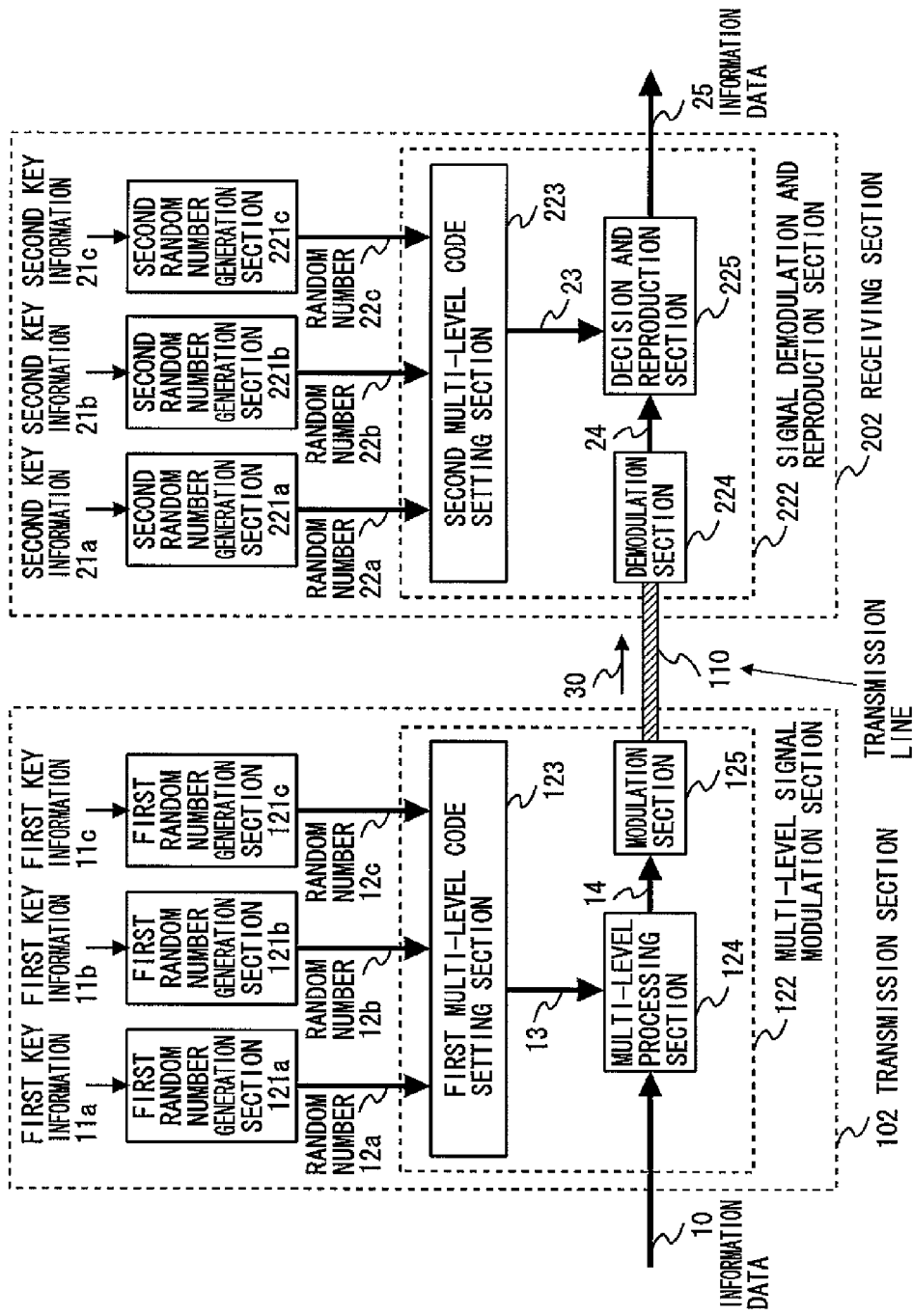
FIG. 7 is a block diagram showing a configuration of a data communication apparatus 2 according to a second embodiment of the present invention.

The present embodiment generalizes an exemplary case where the random numbers, each composed of multi-levels, are generated by first random number generation sections 121a to 121c and by second random number generation sections 221a to 221c. FIG. 7 is a block diagram showing a configuration of a data communication apparatus 2 according to a second embodiment of the present invention. As shown in FIG. 7, the data communication apparatus 2 has a configuration in which a transmitting section 102 and a receiving section 202 are connected to each other via the transmission line 110. The transmitting section 102 includes the first random number generation sections 121a to 121c, a first multi-level code setting section 123, a multi-level processing section 124 and a modulation section 125. The receiving section 202 includes the second random number generation sections 221a to 221c, a second multi-level code setting section 223, a demodulation section 224 and a decision and reproduction section 225.

The transmitting section 102 and the receiving section 202 previously retain the first key information 11a to 11c and the second key information 21a to 21c, respectively, which are identical in content to each other. Relations between the first key information 11a to 11c and the second key information 21a to 21c are the same as those described in the first embodiment. Hereinafter, an operation of the transmitting section 102 will be described. In the transmitting section 102, the first random number generation sections 121a to 121c use the first key information 11a to 11c as initial values, and output the random numbers 12a to 12c, which are multi-level pseudo random numbers. In accordance with a predetermined rule, the first multi-level code setting section 123 generates and outputs the multi-level code sequence 13 by using the values of the random numbers 12a to 12c inputted thereto. Since functions of the multi-level processing section 124 and the modulation section 125 are the same as those described in the first embodiment, description thereof will be omitted.

Next, an operation of the receiving section 202 will be described. In the receiving section 202, the second random number generation sections 221a to 221c use the second key information 21a to 21c as the initial values, and output the random numbers 22a to 22c, which are the multi-level pseudo random numbers. In accordance with a rule which is commonly shared with the first multi-level code setting section 123, the second multi-level code setting section 223 generates and outputs the multi-level code sequence 23 by using values of the random number 22a to 22c inputted thereto. Since functions of the demodulation section 224 and the decision and reproduction section 225 are the same as those of the first embodiment, description thereof will be omitted.

Figure 8:
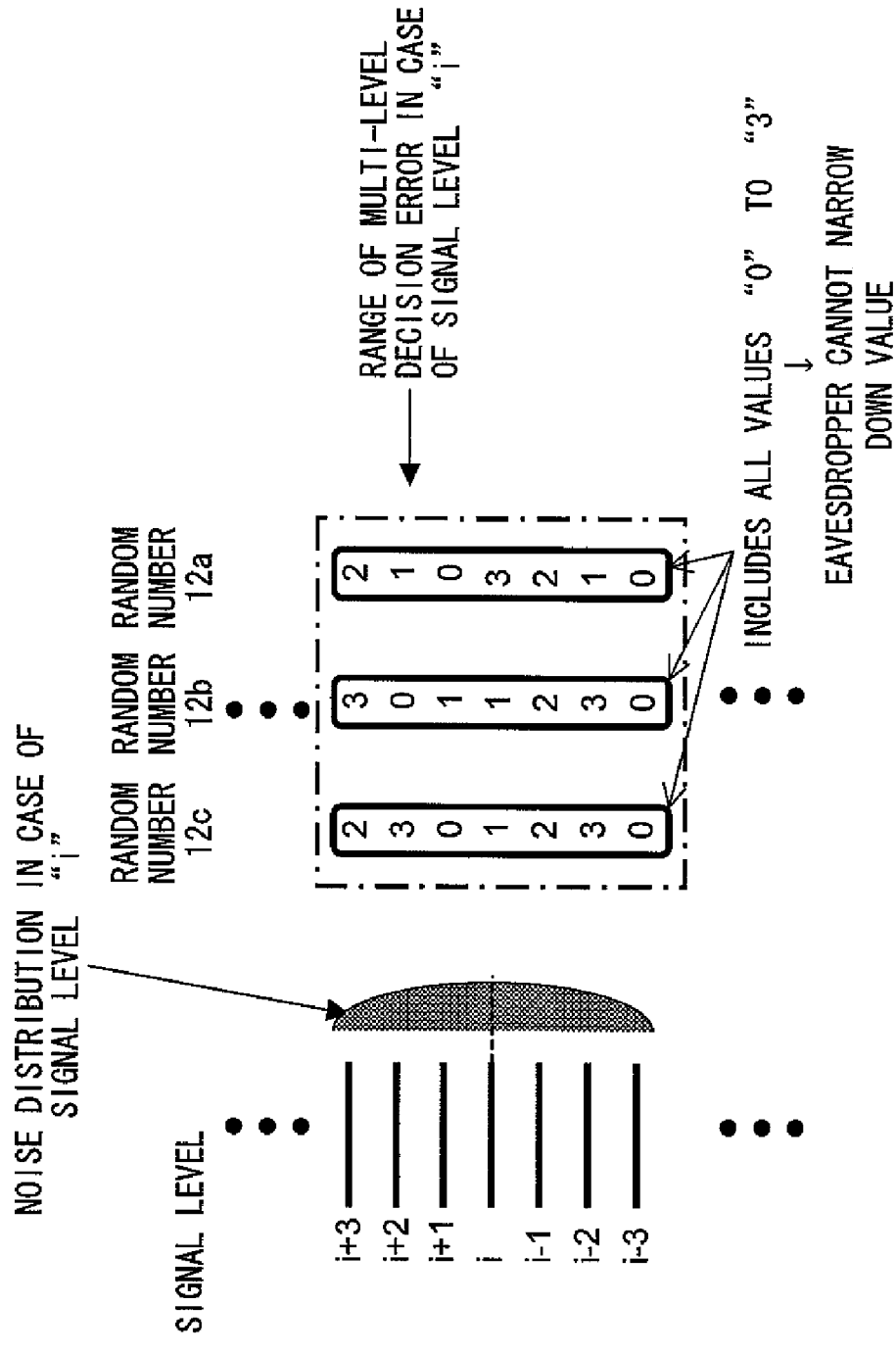
FIG. 8 is a schematic diagram showing a signal point allocation according to the second embodiment of the present invention.

Next, relations between the levels of the multi-level signal and the random numbers 12a to 12c in the present embodiment will be described with reference to a schematic diagram shown in FIG. 8. FIG. 8 shows an exemplary case where the number of the multi-levels of each of the random numbers 12a to 12c is 4, and 7 levels are extracted from the levels of the multi-level signal. An intermediate signal level in the 7 levels is set as a signal level "i". A case will be considered where noise level is distributed over the 7 levels from a level "i−3" to a level "i+3", and the signal level "i" is located at a central portion of the 7 levels. In this case, if the eavesdropper obtains the signal level "i" as a result of a multi-level decision performed by the multi-level decision section 312, a correct signal level having been transmitted is likely to be one of 3 levels from "i−3" to "i+3". That is, a range of the multi-level decision error, which is likely to be made by the eavesdropper, corresponds to a range indicated by chained lines in the diagram. In the case where the values of the random number 12a, which correspond to the signal levels "i−3" to "i+3", include all values from "0" to "3", the eavesdropper cannot narrow down a value of the random number 12a used by a transmitting party. In a similar manner, in the case where the values of each of the random numbers 12b and 12c, the values corresponding to the signal levels "i−3" to "i+3", include all the values from "0" to "3", then the eavesdropper cannot narrow down the value of the each of the random numbers 12b and 12c used by the transmitting party. In this manner, in the case where the signal point allocation is made such that the respective random numbers, which are allocated to the signal levels in the range of the multi-level decision error, include all the values which are possibly taken by the respective random numbers, the eavesdropper cannot narrow down the values of the respective random numbers used by the transmitting party, and thus the security can be ensured. In the present embodiment, regardless of the signal level received by the eavesdropper, the signal point allocation satisfying the above-described condition will be applied.

A specific example realizing this signal point allocation will be described hereinbelow. FIG. 9 is a diagram showing a configuration of the first multi-level code setting section 123 and the multi-level processing section 124. FIG. 9 shows an example in which the number of multi-levels of each of the random numbers 12a to 12c is 4, and each of the random numbers 12a to 12c is represented as a 2-bit parallel signal. The first multi-level code setting section 123 includes modulo operation sections 1231b and 1231c. The modulo operation section 1231b divides a value, which is obtained by performing an addition or a subtraction between the random number 12a and the random number 12b, by the number of the multi-levels (4 in the case of FIG. 9), and outputs a remainder of the division. The modulo operation section 1231c divides a value, which is obtained by performing the addition or the subtraction between the random number 12a and the random number 12c, by the number of the multi-levels of the random number (4 in the case of FIG. 9), and outputs a remainder of the division. The random number 12a is outputted, in situ, from the first multi-level code setting section 123 as low-order two bits of the multi-level code sequence 13, and the remainders outputted from the modulo operation sections 1231b and 1231c are outputted as remaining order bits of the multi-level code sequence 13.

The multi-level processing section 124 includes an XOR operation section 1241 and a D/A conversion section 1242. The information data 10 and one bit of the multi-level code sequence 13 are inputted to the XOR operation section 1241, and are subject to the XOR operation. A resultant thereof is then outputted. The one bit of the multi-level code sequence 13 to be inputted to the XOR operation section 1141 may be is selected arbitrarily. However, preferably, as low-order a bit as possible is to be inputted. The reason for this is the same as that described in the first embodiment. A signal outputted from the XOR operation section 1241 is inputted to the D/A conversion section 1242 as a highest-order bit, and the multi-level code sequence 13 is inputted to the same as remaining order bits. The D/A conversion section 1242 performs the D/A conversion on the inputted bits and outputs a resultant thereof as the multi-level signal 14.

FIG. 10 is a diagram showing an exemplary configuration of the second multi-level code setting section 223 and the decision and reproduction section 225. As shown in FIG. 10, the second multi-level code setting section 223 includes modulo operation sections 2231b and 2231c. A function of the second multi-level code setting section 223 is the same as that of the first multi-level code setting section 123, and thus description thereof will be omitted. The decision and reproduction section 225 includes a D/A conversion section 2251, a decision section 2252 and an XOR operation section 2253. Functions thereof are the same as those described in the first embodiment, and thus description thereof will be omitted.

Next, inputs/outputs to/from the multi-level code setting section shown in FIGS. 9 and 10 will be tabulated in FIG. 11 (in the case where additions are performed by the modulo operation sections 1231b, 1231c, 2231b and 2231c). In the table, the random numbers 12a to 12c are denoted by a to c. When values of the random numbers 12c, 12b and 12a are "0, 0, 0", respectively, the random number 12a is added to the random number 12c and to the random number 12b, respectively, resultants of the additions are divided by 4, respectively, and resultants of the divisions (outputted from the modulo operation sections 1231c and 1231b) come to "0, 0". The random number 12a is added, in situ, to the resultants of the divisions, as lowest-order 2 bits, whereby the multi-level code sequence 13 is obtained, and the value thereof is represented by "0" in the decimal format. In a similar manner, when the values of the random numbers 12c, 12b, and 12a are "0, 0, 1", respectively, the random number 12a is added to the random number 12c and to the random number 12b, respectively, resultants of the additions are respectively divided by 4, and resultants of the divisions come to "1, 1". Accordingly, the value of the multi-level code sequence 13 comes to "21" in the decimal format. In the case of other values, a relation between the random numbers 12a to 12c and the multi-level code sequence 13 are set in a similar manner.

Figure 12:
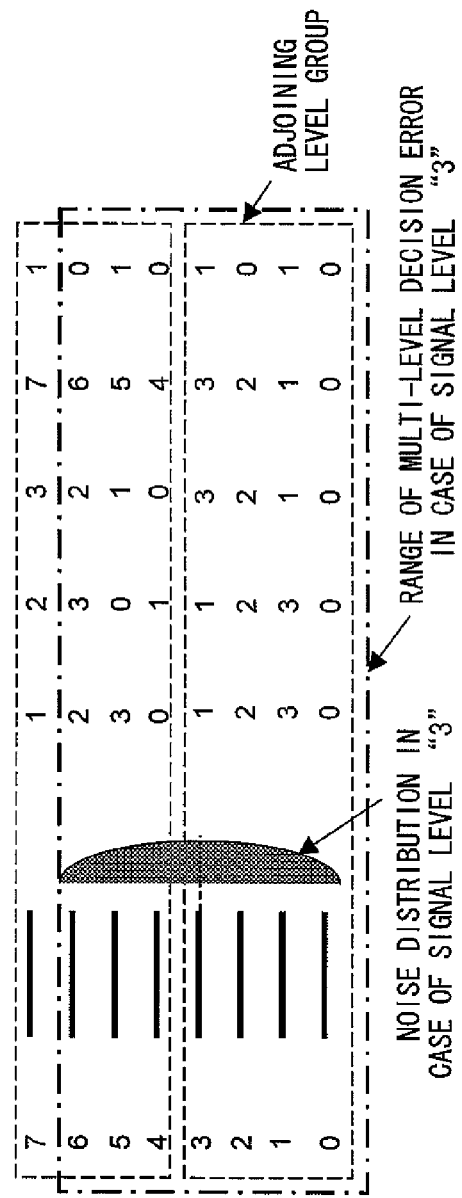
FIG. 12 is a diagram showing a specific example of the signal point allocation according to the second embodiment of the present invention.

The signal point allocation in the case where the configurations shown in the FIGS. 9 and 10 are used will be described with reference to FIG. 12. FIG. 12 shows relations between the levels of the multi-level signal and values of the random numbers 12a to 12c, the multi-level code sequence 13 and the information data 10, each value corresponding to each level of the multi-level signal. The levels of the multi-level signal are divided into groups each comprised of near 4 (the same number as the number of the multi-levels of the random numbers 12a to 12c) levels (indicated by dashed lines in the diagram and hereinafter referred to as near level groups). The values of the random number 12a are allocated to the 4 levels in each of the near level groups such that the values include all the values from "0" to "3". In a similar manner, the values of each of the random numbers 12b and 12c are allocated to the 4 levels such that the levels such that the values include all the values from "0" to "3". A case where the noise level is distributed over 7 levels, that is, a case where the multi-level decision error ranges over the 7 levels (a range indicated by chain lines in the diagram), will be considered. In this case, in the range of the multi-level decision error, one near level group is inevitably included. Therefore, the values of the random number 12a corresponding to the signal levels in the range of the multi-level decision error include all the values from "0" to "3". In a similar manner, the values of each of the random numbers 12b and 12c corresponding to the signal levels in the range of the multi-level decision error inevitably include all the values from "0" to "3". Therefore, the signal point allocation illustrated in the schematic diagram shown in FIG. 8 can be realized. Accordingly, the eavesdropper cannot narrow down the values of the random numbers 12a to 12c, and thus the security can be ensured.

The signal point allocation which satisfies the condition illustrated in FIG. 8 can be realized by using a configuration different from that above described. FIG. 13 is a diagram showing another exemplary configuration of the first multi-level code setting section 123. In the exemplary configuration, the first multi-level code setting section 123 includes XOR operation sections 1232b, 1232c, 1233b and 1233c. The XOR operation section 1232b performs the XOR operation between a low-order bit of the random number 12b and a low-order bit of the random number 12a, and outputs a resultant of the XOR operation. The XOR operation section 1233b performs the XOR operation between a high-order bit of the random number 12b and a high-order bit of the random number 12a, and outputs a resultant of the XOR operation. The XOR operation section 1232c performs the XOR operation between a low-order bit of the random number 12c and the low-order bit of the random number 12a, and outputs a resultant of the XOR operation. The XOR operation section 1233c performs the XOR operation between a high-order bit of the random number 12c and the high-order bit of the random number 12a, and outputs a resultant of the XOR operation. The random number 12a is outputted, in situ, from the first multi-level code setting section 123 as low-order two bits of the multi-level code sequence 13, and the resultants outputted from the XOR operation sections 1232b, 1232c, 1233b and 1233c are outputted as remaining bits of the multi-level code sequence 13.

In this exemplary configuration, the second multi-level code setting section 223 has the same configuration as that shown in FIG. 13. On the other hand, configurations and functions of other blocks are the same as those described with reference to FIGS. 7, 9 and 10.

Inputs/outputs to/from the multi-level code setting section shown in FIG. 13 will be tabulated in FIG. 14. In a table shown in FIG. 14, the random numbers 12a to 12c are denoted by a to c. In the case where the values of the random number 12c, 12b, and 12a are "00, 00, 00" (in a binary format), resultants of the XOR operation between the random number 12a and the random number 12c and the XOR operation between the random number 12a and the random number 12b come to "00, 00". The random number 12a is added in situ to the resultants of the XOR operations as two lowest-order bits, whereby the multi-level code sequence 13 is obtained, and the value thereof is represented by "0" in the decimal format. In a similar manner, in the case where the values of the random number 12c, 12b and 12a are "00, 00, 01", resultants of the XOR operation between the random number 12a and the random number 12c and that between the random number 12a and the random number 12b come to "01, 01". Accordingly, the value of the multi-level code sequence 13 comes to "21" in the decimal format. In the case of other values, relations between the random numbers 12a to 12c and the multi-level code sequence 13 are set in a similar manner.

Figure 15:
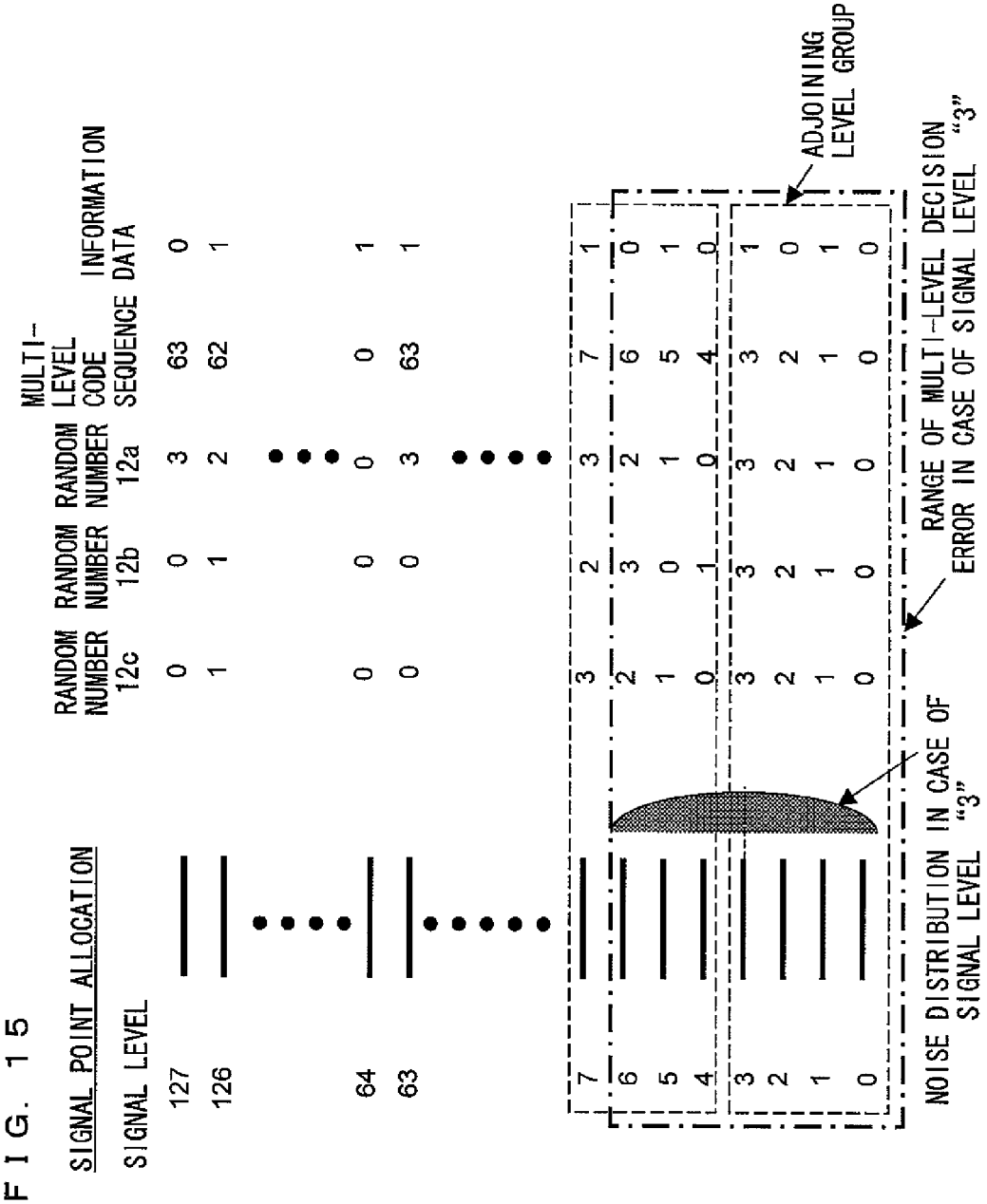
FIG. 15 is a diagram showing a specific example of the signal point allocation according to the second embodiment of the present invention.

The signal point allocation in the case where the configuration shown in FIG. 13 is applied is shown in FIG. 15. As with the signal point allocation shown in FIG. 12, the respective random numbers 12a, 12b and 12c allocated to the 4 levels in each of the near level groups include all the values from "0" to "3". Therefore, the values of the respective random numbers 12a, 12b and 12c corresponding to the signal levels in the range of the multi-level decision error inevitably include all the values from "0" to "3". Accordingly, the signal point allocation illustrated in the schematic diagram shown in FIG. 8 can be realized.

The security in the above-described two configurations can be described as follows. That is, the eavesdropper cannot correctly identify adjoining 3 levels on both sides of one level of the multi-level signal due to the effects of the noise, and thus cannot identify the values of the random number 12a which correspond to low-order 2 bits of the level of the multi-level signal (inputted to the D/A conversion section 1242). On the other hand, the eavesdropper can distinguish the levels of the multi-level signal, the level being relatively far from each other, and thus can correctly identify bits inputted to the D/A conversion section 1242 as high-order bits. However, the high-order bits inputted to the D/A conversion section 1242 are determined by the operation between the random number 12a and the random number 12b and that between the random number 12a and the random number 12c. Therefore, in order to identify the values of the random number 12b and 12c, the eavesdropper needs to obtain the value of the random number 12a as well as the high-order bits inputted to the D/A conversion section 1242. Since the value of the random number 12a is not known, the values of the random numbers 12b and 12c cannot be identified. Therefore, the eavesdropper cannot identify any values of the random numbers. Accordingly, the security can be ensured.

Figure 16:
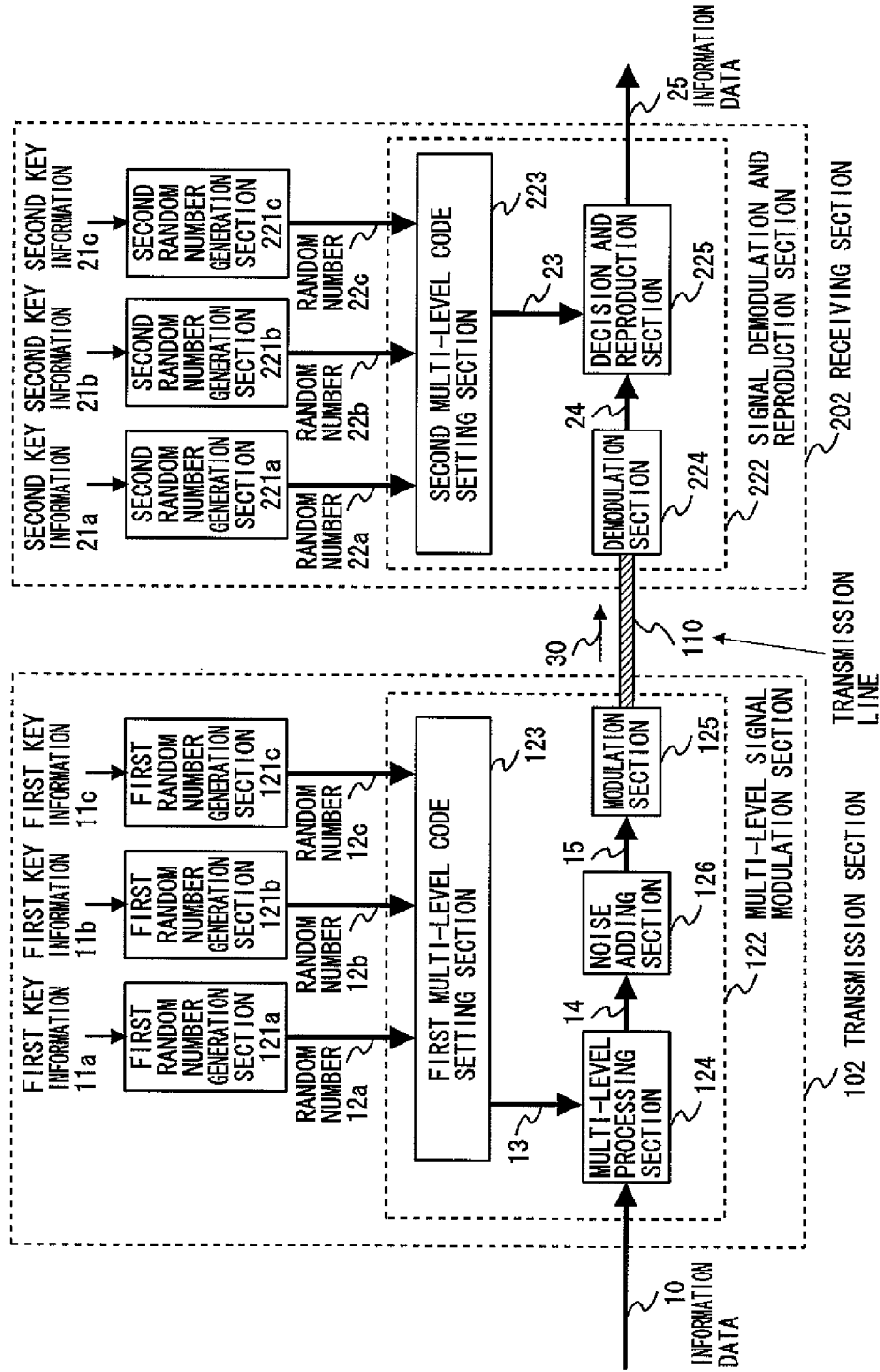
FIG. 16 is a block diagram showing a configuration of a data communication apparatus $2x$ according to the second embodiment of the present invention.
Figure 17:
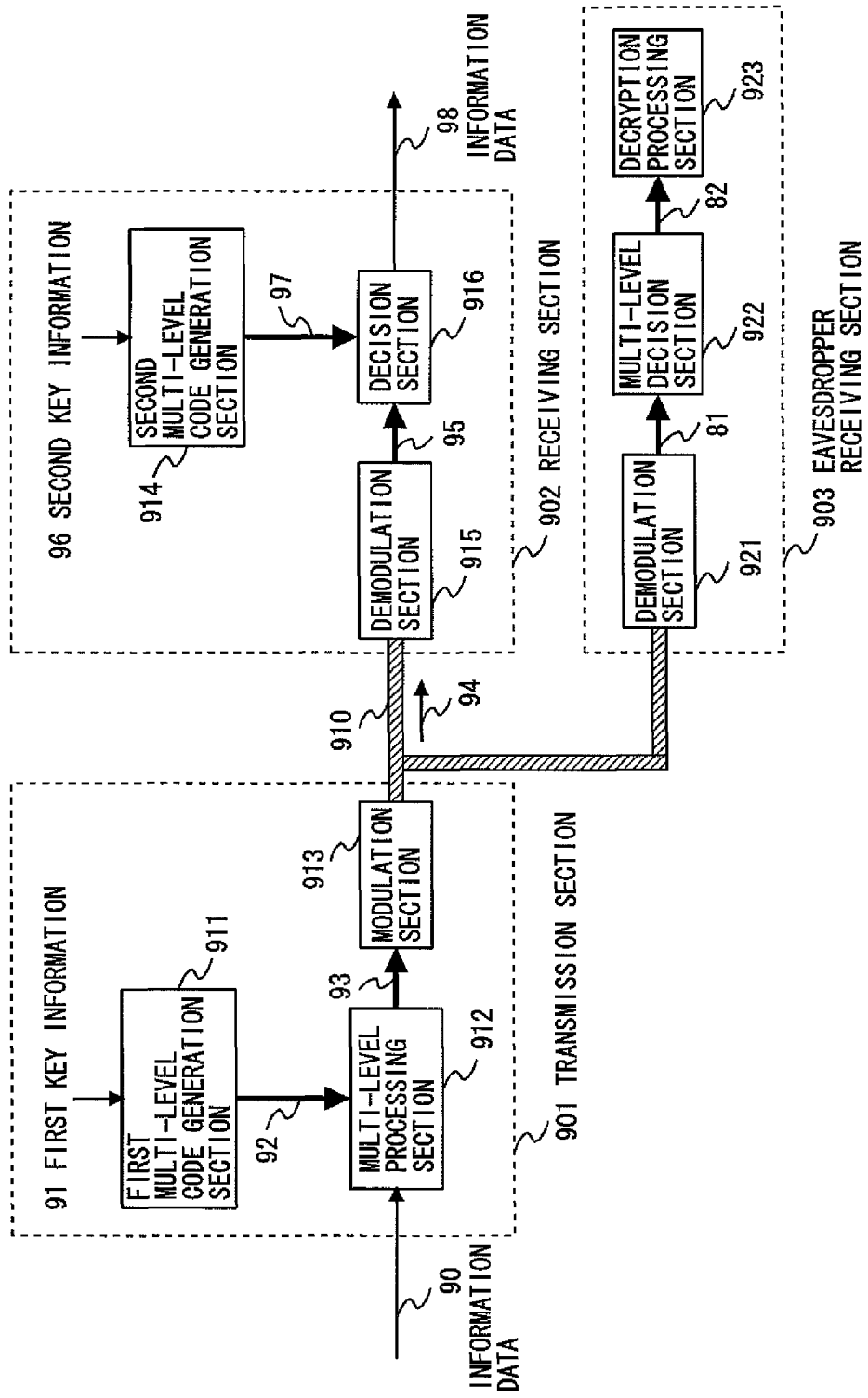
FIG. 17 is a diagram illustrating an example of a conventional transmitting and receiving apparatuses using a Y-00 protocol disclosed in Patent Document 1.
Figure 18:
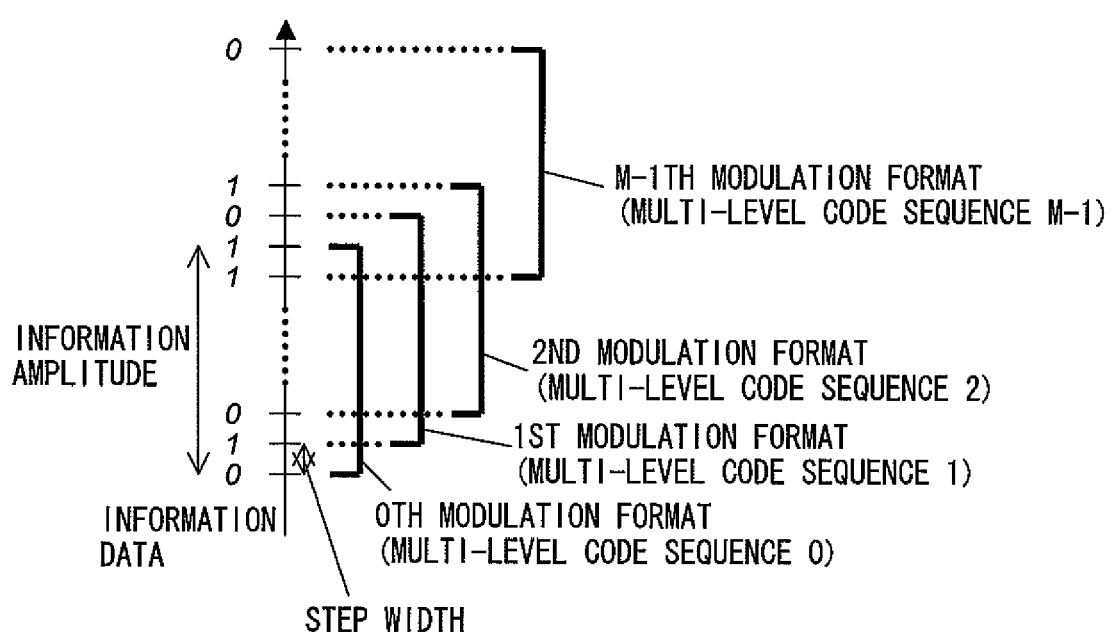
FIG. 18 is a diagram showing an exemplary signal format of the conventional transmitting and receiving apparatuses.
Figure 19:
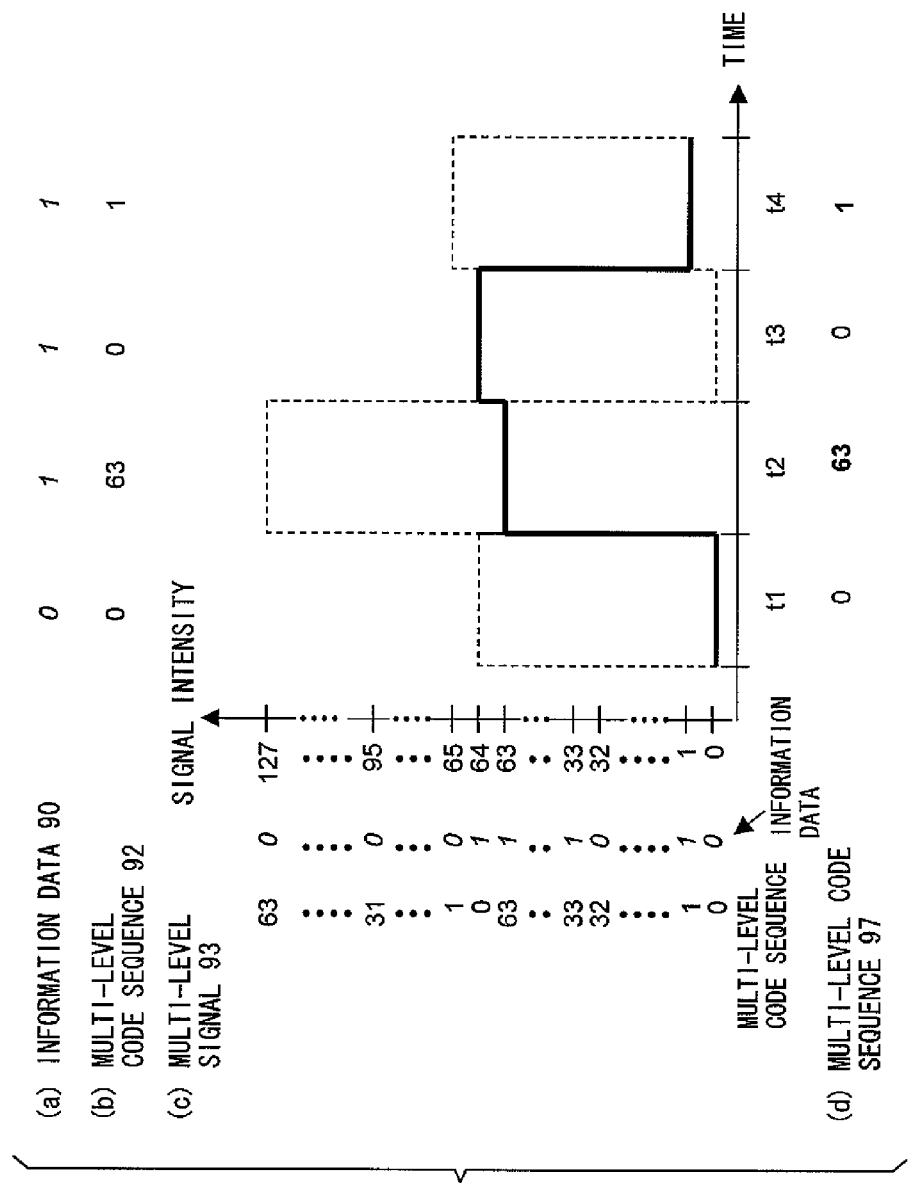
FIG. 19 is a diagram illustrating, in detail, an operation of the conventional transmitting and receiving apparatuses.
Figure 20:
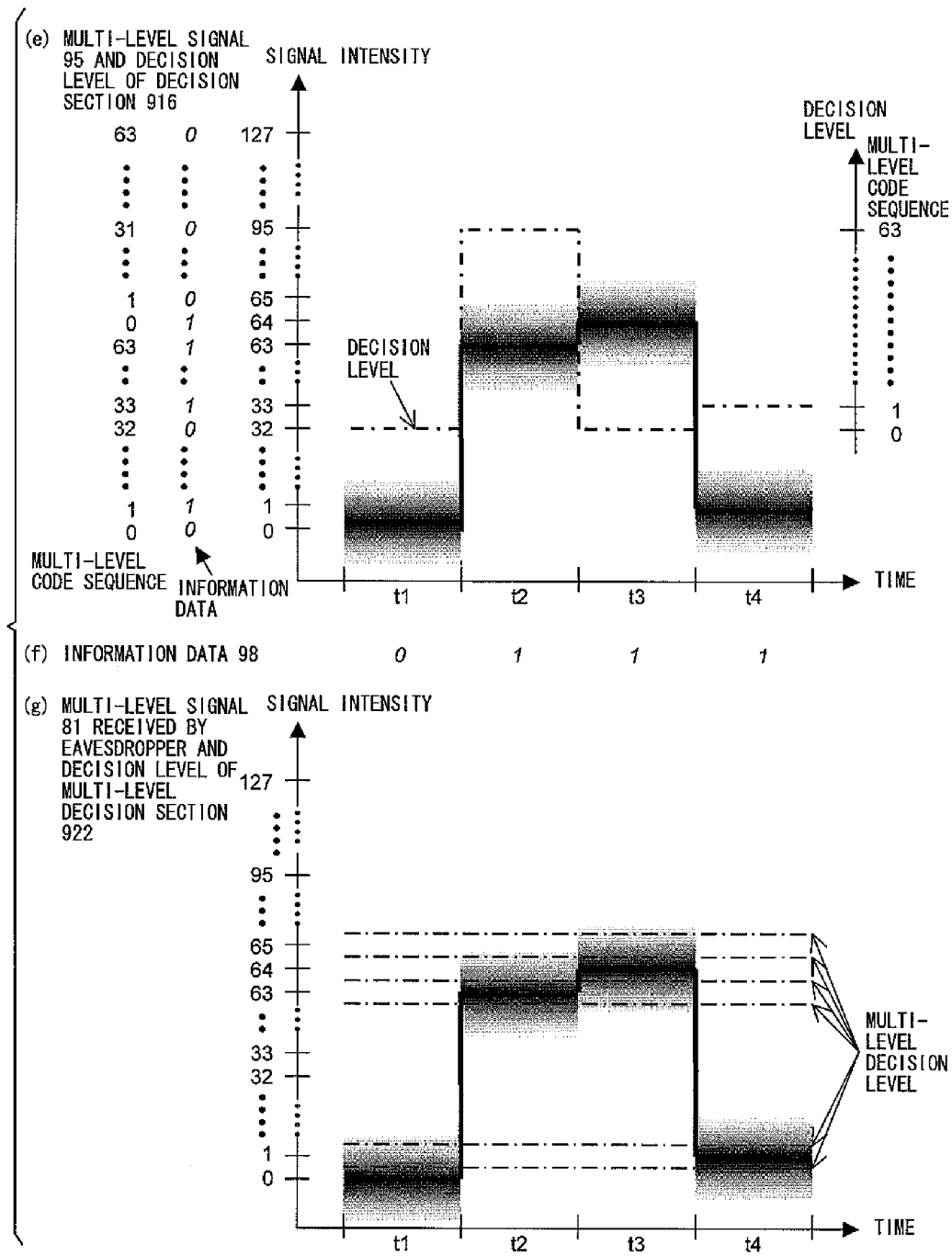
FIG. 20 is a diagram illustrating, in detail, the operation of the conventional transmitting and receiving apparatuses.
Figure 21:
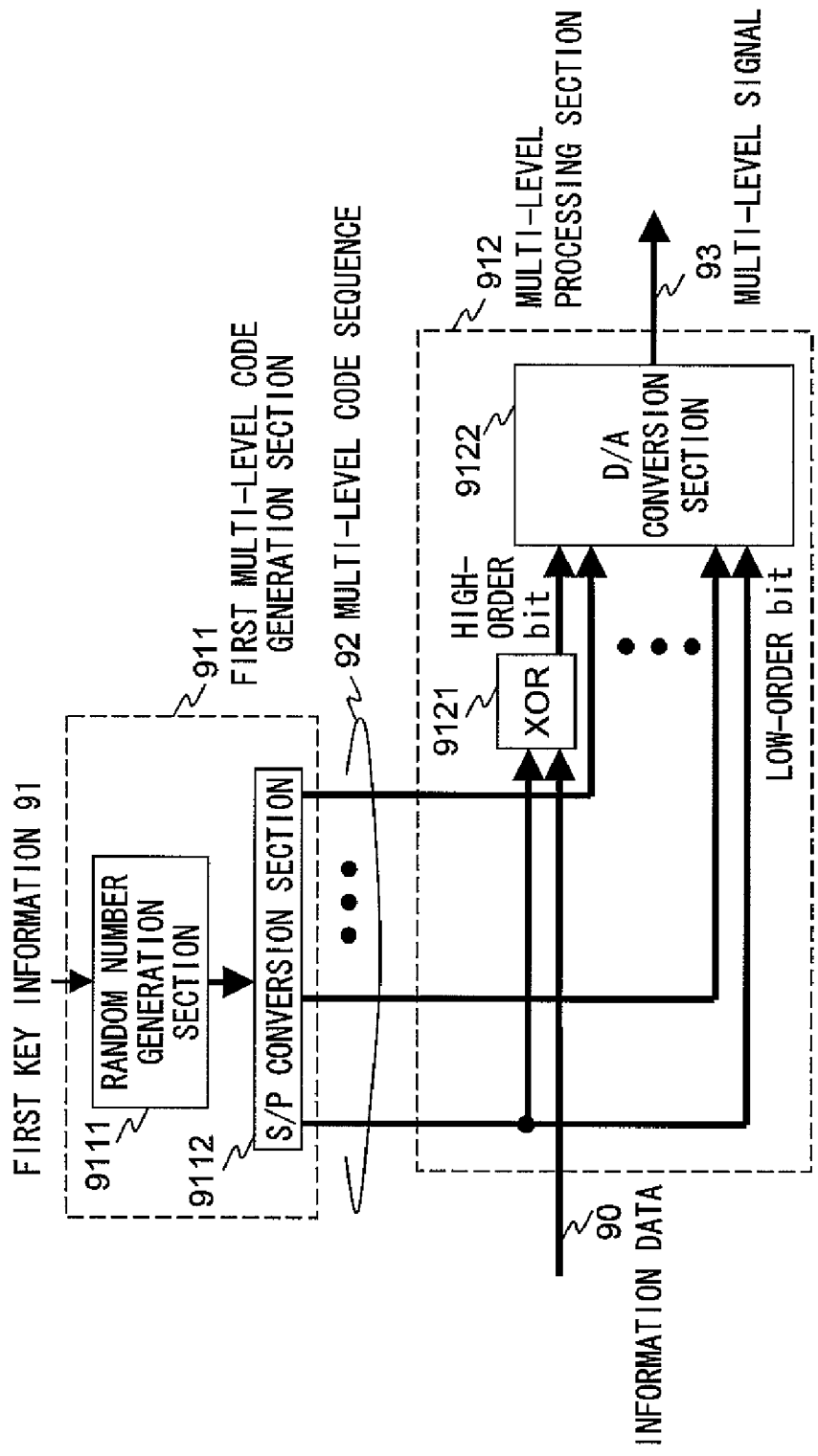
FIG. 21 is a diagram showing an exemplary configuration of a first multi-level code generation section 911 and a multi-level processing section 912 in the conventional transmitting and receiving apparatuses.
Figure 22:
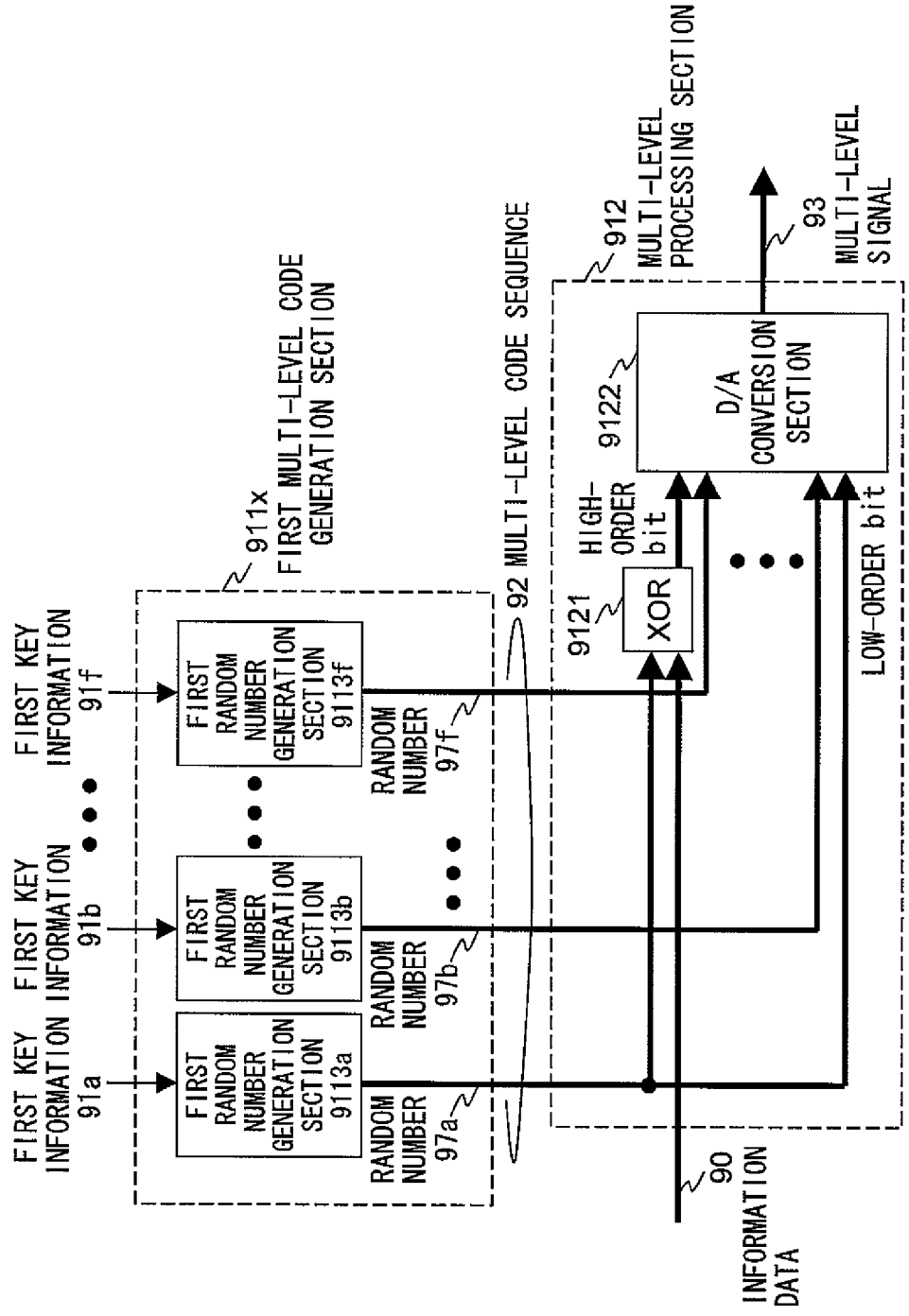
FIG. 22 is a diagram showing an exemplary configuration of a first multi-level code generation section 911x and the multi-level processing section 912 in the conventional transmitting and receiving apparatuses.
Figure 23:
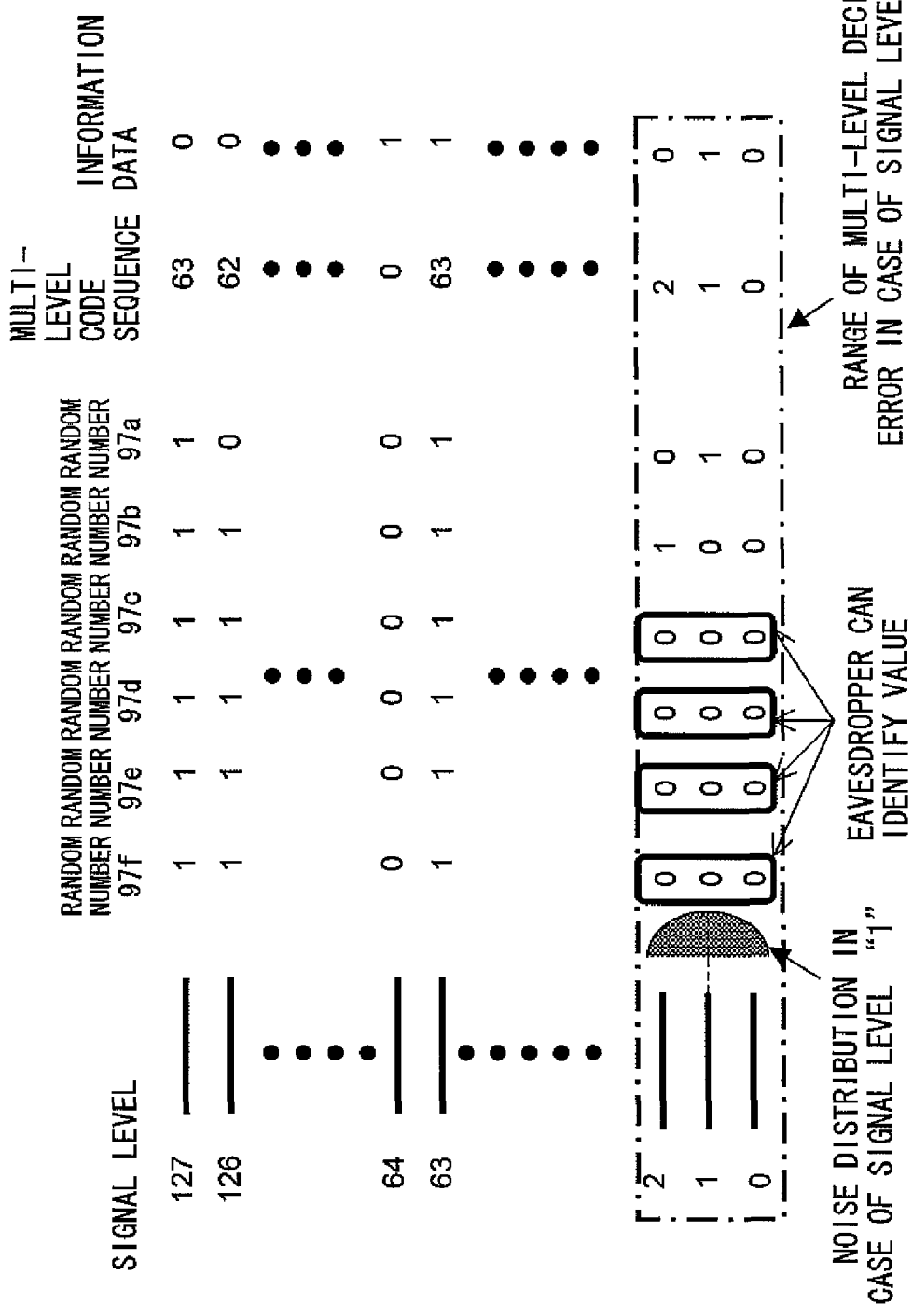
FIG. 23 is a diagram showing an exemplary signal point allocation in the case where the configuration shown in FIG. 22 is used.

The above description is exemplified by the case where the noise level is distributed over the 7 levels. However, the noise level may be distributed over more than 7 levels as long as the range of the levels is receivable by the legitimate receiving party. In order to realize the noise level, the noise overlapped on the modulated signal is not limited to the shot noise. Instead, the noise may be separately added inside the transmitting section 102. For example, as in the case of a data communication apparatus 2x shown in FIG. 16, there may be adopted a configuration in which a noise adding section 126 which generates a random noise and which adds the same to the multi-level signal 14 (or to the modulated signal 30) is provided, whereby a desired noise level is realized.

Further, the above description is exemplified by a case where the number of the random numbers is 3, the number of the multi-levels of each of the random numbers is 4, and the number of the multi-levels of the multi-level code sequence 13 is 64, however, the case is merely an example. It is understood that the number of the random numbers and the number of the multi-levels may be set arbitrarily. In this case, the number of the levels of the multi-level signal included in each of the near level groups shown in FIG. 12 corresponds to the number of the multi-levels of each of the random numbers. Further, the noise level is set to be equal to or more than twice the distance between farthest two signal levels in each of the near level groups (a maximum distance between the signal points).

The exemplary configurations described, as methods for determining the value of the multi-level code sequence 13, are the configuration in which an addition (or a subtraction) is performed, and a resultant of the addition (or the subtraction) is divided by the number of the multi-levels so as to obtain the remainder, and the configuration in which the XOR operation is used. The signal point allocation is also described. However, these are merely examples, and if the condition illustrated in the schematic diagram shown in FIG. 8 is satisfied, that is, if the condition, in which values of each of the random numbers allocated to the levels in the range of the multi-decision error include all the values which are possibly taken by each of the random numbers, is satisfied, any configuration, any operation processing and any signal point allocation which are different from those described above may be used. For example, there may be adopted a configuration in which the relation between the random numbers and the multi-level code sequence, or the relation among the random numbers, the information data and the levels of the multi-level signal is set in accordance with a conversion table. Alternatively, respective component parts shown in FIG. 7 are not necessarily configured with hardware. Instead, functions thereof may be realized by software processing. Further, as long as the condition described in the schematic diagram shown in FIG. 8 is satisfied, intervals between the signal levels may be uneven, or some of the signal levels may be overlapped with each other.

As above described, in the present embodiment even in the case where the multi-level signal is generated by using a plurality of the random numbers each having an arbitrary number of multi-levels, the eavesdropper cannot identify the values of each of the random number by using the multi-level decision result. Therefore, in the same manner as the first embodiment, the security can be ensured even with the use of a plurality of relatively low-speed random number generation sections.

The present invention is applicable to an apparatus for performing cipher communication which prevents interception by a third party, and is particularly useful in preventing decryption of the modulated signal on the transmission line.

While the invention has been described in detail, the foregoing description is in all aspects illustrative and not restrictive. It is understood that numerous other modifications and variations can be devised without departing from the scope of the invention.

What is claimed is:

1. A data transmitting apparatus for multi-leveling information data by using predetermined key information and for performing secret communication with a receiving apparatus, the data transmitting apparatus comprising:
 a plurality of pseudo random number generators for respectively generating random numbers, each generated random number of the generated random numbers being a multi-level pseudo random number composed of a binary number, and each generated random number being generated using the predetermined key information; and
 a multi-level signal modulation section including:
  a multi-level code setting section including a plurality of first XOR circuits performing exclusive OR operations between a first random number and remaining random numbers of a multi-level sequence composed of a combination of values of the random numbers generated by the plurality of pseudo random number generators, so as to output a multi-level code sequence in which (i) the first random number is set as a lowest order bit and (ii) outputs from the plurality of first XOR circuits are set as remaining order bits;
  a multi-level processing section including a second XOR circuit performing an exclusive OR operation between the information data and a bit of the multi-level code sequence, and including a D/A converter to which an output from the second XOR circuit is inputted as a highest order bit and to which the multi-level code sequence is inputted as the remaining order bits, the multi-level processing section outputting a D/A conversion result of the D/A converter as a multi-level signal; and
  a modulator for modulating the multi-level signal to generate a multi-level modulated signal,
 wherein the multi-level signal modulation section is configured to select, from among multi levels previously prepared, a level corresponding to the information data and the multi-level sequence composed of the combination of values of the random numbers generated by the plurality of pseudo random number generators, and configured to generate, by using the selected level, the multi-level modulated signal including a noise having a predetermined noise level, and
 wherein a plurality of levels of the multi-level modulated signal is in a predetermined range of an amplitude or an intensity, and a plurality of multi-level sequences corresponding to the plurality of levels of the multi-level modulated signal includes, as values composing respective digits thereof, all of the values of the random numbers respectively generated by the plurality of pseudo random number generators.

2. The data transmitting apparatus according to claim 1, wherein adjoining two levels of the plurality of levels of the multi-level modulated signal are in the predetermined range of the amplitude or the intensity.

3. The data transmitting apparatus according to claim 1, wherein the predetermined noise level is at least twice as large as a maximum difference between farthest two levels of the plurality of levels of the multi-level modulated signal in the predetermined range of the amplitude or the intensity.

4. The data transmitting apparatus according to claim 2, wherein two levels of the multi-level sequences corresponding to the adjoining two levels of the multi-level modulated signal are composed of values of each random number of the generated random numbers outputted from the plurality of pseudo random number generators, the values of the generated random numbers being different from each other.

5. The data transmitting apparatus according to claim 2, wherein the multi-level signal modulation section further includes a noise adding section including a circuit for generating a random noise and a circuit for adding the random noise to the multi-level signal or to the multi-level modulated signal.

6. A data transmitting apparatus for multi-leveling information data by using predetermined key information and for performing secret communication with a receiving apparatus, the data transmitting apparatus comprising:
 a plurality of pseudo random number generators for respectively generating first to Nth random numbers, each generated random number of the generated first to Nth random numbers being a multi-level pseudo random number, each generated first to Nth random number being generated using the predetermined key information, and a number of multi levels of each generated random number being $2^m$; and
 a multi-level signal modulation section including:
  a multi-level code setting section including a plurality of modulo operation circuits, each modulo operation circuit of the plurality of modulo operation circuits performing an adding or subtracting operation between a first random number and second to Nth random numbers of a multi-level sequence composed of a combination of values of parallel signals of the first to Nth random numbers generated by the plurality of pseudo random number generators, and performing division of a resultant of the adding or the subtracting by $2^m$, so as to obtain a remainder, and so as to output a multi-level code sequence of a parallel signal, of the parallel signals, in which (i) the first random number is set as a low-order m bit and (ii) outputs from the plurality of modulo operation circuits are set as upper order bits;
  a multi-level processing section including an XOR circuit performing an exclusive OR operation between the information data and a bit of the multi-level code sequence, and including a D/A converter to which an output from the XOR circuit is inputted as a highest order bit and to which the multi-level code sequence is inputted as the remaining order bits, the multi-level processing section outputting a D/A conversion result of the D/A converter as a multi-level signal; and
  a modulator for modulating the multi-level signal to generate a multi-level modulated signal,
 wherein the multi-level signal modulation section is configured to select, from among multi levels previously prepared, a level corresponding to the information data and the multi-level sequence composed of the combination of values of the first to Nth random numbers generated by the plurality of pseudo random number generators, and configured to generate, by using the selected level, the multi-level modulated signal including a noise having a predetermined noise level, and
 wherein a plurality of levels of the multi-level modulated signal is in a predetermined range of an amplitude or an intensity, and a plurality of multi-level sequences corresponding to the plurality of levels of the multi-level modulated signal includes, as values composing respective digits thereof, all of the values of the first to Nth random numbers respectively generated by the plurality of pseudo random number generators.

7. The data transmitting apparatus according to claim 6, wherein a number of multi levels of the first to Nth random numbers outputted from the plurality of pseudo random number generators are equal to one another, and
wherein adjoining levels of the plurality of levels of the multi-level modulated signal, having a number equal to the number of the multi levels, are in the predetermined range of the amplitude or the intensity.

8. A data transmitting apparatus for multi-leveling information data by using predetermined key information and for performing secret communication with a receiving apparatus, the data transmitting apparatus comprising:
  a plurality of pseudo random number generators for respectively generating first to Nth random numbers, each generated random number of the generated first to Nth random numbers being a multi-level pseudo random number, each generated first to Nth random number being generated using the predetermined key information, and a number of multi levels of each generated random number being $2^m$; and
  a multi-level signal modulation section including:
    a multi-level code setting section including a plurality of first XOR circuits performing exclusive OR operations between a first random number and second to Nth random numbers of a multi-level sequence composed of a combination of values of parallel signals of the first to Nth random numbers generated by the plurality of pseudo random number generators, so as to output a multi-level code sequence of a parallel signal, of the parallel signals, in which (i) the first random number is set as a low-order m bit and (ii) outputs from the plurality of first XOR circuits are set as upper order bits;
    a multi-level processing section including a second XOR circuit performing an exclusive OR operation between the information data and a bit of the multi-level code sequence, and including a D/A converter to which an output from the second XOR circuit is inputted as a highest order bit and to which the multi-level code sequence is inputted as the remaining order bits, the multi-level processing section outputting a D/A conversion result of the D/A converter as a multi-level signal; and
    a modulator for modulating the multi-level signal to generate a multi-level modulated signal,
  wherein the multi-level signal modulation section is configured to select, from among multi levels previously prepared, a level corresponding to the information data and the multi-level sequence composed of the combination of values of the first to Nth random numbers generated by the plurality of pseudo random number generators, and configured to generate, by using the selected level, the multi-level modulated signal including a noise having a predetermined noise level, and
  wherein a plurality of levels of the multi-level modulated signal is in a predetermined range of an amplitude or an intensity, and a plurality of multi-level sequences corresponding to the plurality of levels of the multi-level modulated signal includes, as values composing respective digits thereof, all of the values of the first to Nth random numbers respectively generated by the plurality of pseudo random number generators.

9. The data transmitting apparatus according to claim 6, wherein the predetermined noise level is at least twice as large as a maximum difference between farthest two levels of the plurality of levels of the multi-level modulated signal in the predetermined range of the amplitude or the intensity.

10. The data transmitting apparatus according to claim 6, wherein the multi-level signal modulation section further includes a noise adding section including a circuit for generating a random noise and a circuit for adding the random noise to the multi-level signal or to the multi-level modulated signal.

11. A data receiving apparatus for reproducing information data from a received modulated signal by using predetermined key information and performing secret communication with a transmitting apparatus, the data receiving apparatus comprising:
  a plurality of pseudo random number generators for respectively generating random numbers, each generated random number of the generated random numbers being a multi-level pseudo random number composed of a binary number, and each generated random number being generated using the predetermined key information; and
  a signal demodulation and reproduction section including:
    a demodulator for demodulating the received modulated signal, so as to output a multi-level signal;
    a multi-level code setting section including a plurality of first XOR circuits performing exclusive OR operations between a first random number and remaining random numbers of a multi-level sequence composed of a combination of values of the random numbers generated by the plurality of pseudo random number generators, so as to output a multi-level code sequence in which (i) the first random number is set as a lowest order bit and (ii) outputs from the plurality of first XOR circuits are set as remaining order bits; and
    a decision and reproduction section including:
      a D/A converter performing a D/A conversion of the multi-level code sequence;
      a circuit for binary decision of the multi-level signal to be inputted using an output from the D/A converter as a decision level; and
      a second XOR circuit performing an exclusive OR operation between a bit of the multi-level code sequence and an output from the circuit for binary decision, so as to output a resultant of the second XOR circuit as the information data,
  wherein the signal demodulation and reproduction section is configured to demodulate and reproduce the information data in accordance with the received modulated signal and the multi-level sequence composed of the combination of values of the random numbers generated by the plurality of pseudo random number generators, and
  wherein a plurality of levels of the multi-level modulated signal is in a predetermined range of an amplitude or an intensity, and multi-level sequences corresponding to the plurality of levels of the multi-level modulated signal include, as values composing respective digits thereof, all of the values of the random numbers generated by the plurality of the pseudo random number generators.

12. A data receiving apparatus for reproducing information data from a received modulated signal by using predetermined key information and performing secret communication with a transmitting apparatus, the data receiving apparatus comprising:
  a plurality of pseudo random number generators for respectively generating first to Nth random numbers, each generated random number of the generated first to Nth random numbers being a multi-level pseudo random number, each generated first to Nth random number being generated using the predetermined key information, and a number of multi levels of each generated random number being $2^m$; and a signal demodulation and reproduction section including:
a demodulator for demodulating the received modulated signal, so as to output a multi-level signal;
a multi-level code setting section including a plurality of modulo operation circuits, each modulo operation circuit of the plurality of modulo operation circuits performing an adding or subtracting operation between a first random number and second to Nth random numbers of a multi-level sequence composed of a combination of values of parallel signals of the first to Nth random numbers generated by the plurality of pseudo random number generators, and performing division of a resultant of the adding or the subtracting by $2^m$, so as to obtain a remainder, and so as to output a multi-level code sequence of a parallel signal, of the parallel signals, in which (i) the first random number is set as a low-order m bit and (ii) outputs from the plurality of modulo operation circuits are set as upper order bits; and
decision and reproduction section including:
a D/A converter performing a D/A conversion of the multi-level code sequence;
a circuit for binary decision of the multi-level signal to be inputted using an output from the D/A converter as a decision level; and
an XOR circuit performing an exclusive OR operation between a bit of the multi-level code sequence and an output from the circuit for binary decision, so as to output a resultant of the XOR circuit as the information data,
wherein the signal demodulation and reproduction section is configured to demodulate and reproduce the information data in accordance with the received modulated signal and the multi-level sequence composed of the combination of values of the first to Nth random numbers generated by the plurality of pseudo random number generators, and
wherein a plurality of levels of the multi-level modulated signal is in a predetermined range of an amplitude or an intensity, and multi-level sequences corresponding to the plurality of levels of the multi-level modulated signal include, as values composing respective digits thereof, all of the values of the first to Nth random numbers generated by the plurality of the pseudo random number generators.

13. A data receiving apparatus for reproducing information data from a received modulated signal by using predetermined key information and performing secret communication with a transmitting apparatus, the data receiving apparatus comprising:
a plurality of pseudo random number generators for respectively generating first to Nth random numbers, each generated random number of the generated first to Nth random numbers being a multi-level pseudo random number, each generated firs to Nth random number being generated using the predetermined key information, and a number of multi levels of each generated random number being $2^m$; and
a signal demodulation and reproduction section including:
a demodulator for demodulating the received modulated signal, so as to output a multi-level signal;
a multi-level code setting section including a plurality of first XOR circuits performing exclusive OR operations between a first random number and second to Nth random numbers of a multi-level sequence composed of a combination of values of parallel signals of the first to Nth random numbers generated by the plurality of pseudo random number generators, so as to output a multi-level code sequence in which (i) the first random number is set as a low-order m bit and (ii) outputs from the plurality of first XOR circuits are set as upper order bits; and
decision and reproduction section including:
a D/A converter which performs a D/A conversion of the multi-level code sequence;
a circuit for binary decision of the multi-level signal to be inputted using an output from the D/A converter as a decision level; and
a second XOR circuit performing an exclusive OR operation between a bit of the multi-level code sequence and an output from the circuit for binary decision, so as to output a resultant of the second XOR circuit as the information data,
wherein the signal demodulation and reproduction section is configured to demodulate and reproduce the information data in accordance with the received modulated signal and the multi-level sequence composed of the combination of values of the first to Nth random numbers generated by the plurality of pseudo random number generators, and
wherein a plurality of levels of the multi-level modulated signal is in a predetermined range of an amplitude or an intensity, and multi-level sequences corresponding to the plurality of levels of the multi-level modulated signal include, as values composing respective digits thereof, all of the values of the first to Nth random numbers generated by the plurality of the pseudo random number generators.

14. A data communication method for performing secret communication between a transmitting apparatus and a receiving apparatus by using predetermined key information, the data communication method comprising,
in the transmitting apparatus, the steps of:
generating a plurality of random numbers, each generated random number of the plurality of generated random numbers being a multi-level pseudo random number, and each generated random number being generated using the predetermined key information;
selecting, from among multi levels previously prepared, a level corresponding to information data and a multi-level sequence composed of a combination of values of the plurality of generated random numbers; and
generating, by using the selected level, a multi-level modulated signal including a noise having a predetermined noise level, and transmitting the generated multi-level modulated signal, and
in the receiving apparatus, the steps of:
generating a plurality of random numbers, each generated random number of the plurality of random numbers generated in the receiving apparatus being a multi-level pseudo random number, a number of multi levels of each random number generated in the receiving apparatus being $2^m$, and each random number generated in the receiving apparatus being generated using the predetermined key information; and
demodulating and reproducing the information data in accordance with a received multi-level modulated signal transmitted by the transmitting apparatus and a multi-level sequence composed of a combination of values of the plurality of random numbers generated in the receiving apparatus, through:

demodulating the received multi-level modulated signal, so as to output a multi-level signal;

performing first exclusive OR operations between a first random number and second to Nth random numbers of the multi-level sequence composed of a combination of values of parallel signals of the generated plurality of random numbers generated in the receiving apparatus, and outputting a multi-level code sequence of a parallel signal, of the parallel signals, in which the first random number is set as a low-order m bit and resultants of the first exclusive OR operations are set as upper order bits; and performing a binary decision of the multi-level signal using a result of a D/A conversion of the multi-level code sequence as a decision level, performing a second exclusive OR operation between a bit of the multi-level code sequence and a resultant of the binary decision, and outputting a resultant of the second exclusive OR operation as the information data, wherein a plurality of levels of the multi-level modulated signal is in a predetermined range of an amplitude or an intensity, and multi-level sequences corresponding to the plurality of levels of the multi-level modulated signal include, as values comprising respective digits thereof, all of the values of the random numbers respectively generated in the receiving apparatus by a plurality of pseudo random number generators.

15. A data communication method for performing secret communication between a transmitting apparatus and a receiving apparatus by using predetermined key information, the data communication method comprising, in the transmitting apparatus, the steps of:
generating a plurality of random numbers, each generated random number of the plurality of generated random numbers being a multi-level pseudo random number composed of a binary number, and each generated random number being generated using the predetermined key information;

selecting, from among multi levels previously prepared through:
(i) performing first exclusive OR operations between a first random number and remaining random numbers of a multi-level sequence composed of a combination of values of the plurality of generated random numbers, so as to output a multi-level code sequence in which the first random number is set as a lowest order bit and resultants of the first exclusive OR operations are set as remaining order bits;
(ii) performing a second exclusive OR operation between information data and a bit of the multi-level code sequence, and performing a D/A conversion in which a resultant of the second exclusive OR operation is inputted as a highest order bit and the multi-level code sequence is inputted as the remaining order bits, so as to output the D/A conversion result as a multi-level signal; and
(iii) modulating the multi-level signal to generate a multi-level modulated signal, a level corresponding to the information data and the multi-level sequence composed of the combination of the values of the plurality of generated random numbers; and generating, by using the selected level, a multi-level modulated signal including a noise having a predetermined noise level, and transmitting the generated multi-level modulated signal including the noise, and in the receiving apparatus, the steps of:
generating a plurality of random numbers, each random number of the plurality of generated random numbers generated in the receiving apparatus being a multi-level pseudo random number, and each random number generated in the receiving apparatus being generated using the predetermined key information; and demodulating and reproducing the information data in accordance with a received multi-level modulated signal transmitted from the transmitting apparatus and a multi-level sequence composed of a combination of values of the random numbers generated in the receiving apparatus, wherein a plurality of levels of the multi-level modulated signal is in a predetermined range of an amplitude or an intensity, and multi-level sequences corresponding to the plurality of levels of the multi-level modulated signal include, as values comprising respective digits thereof, all of the values of the random numbers respectively generated in the receiving apparatus by a plurality of pseudo random number generators.

16. A data communication method for performing secret communication between a transmitting apparatus and a receiving apparatus by using predetermined key information, the data communication method comprising, in the transmitting apparatus, the steps of:
generating a plurality of random numbers, each generated random number of the plurality of generated random numbers being a multi-level pseudo random number, and each generated random number being generated using the predetermined key information;

selecting, from among multi levels previously prepared, a level corresponding to information data and a multi-level sequence composed of a combination of values of the plurality of generated random numbers; and generating, by using the selected level, a multi-level modulated signal including a noise having a predetermined noise level, and transmitting the generated multi-level modulated signal, and in the receiving apparatus, the steps of:
generating a plurality of random numbers, each random number of the plurality of random numbers generated in the receiving apparatus being a multi-level pseudo random number composed of a binary number, and each random number generated in the receiving apparatus being generated using the predetermined key information; and demodulating and reproducing the information data in accordance with a received multi-level modulated signal transmitted from the transmitting apparatus and a multi-level sequence composed of a combination of values of the random numbers generated in the receiving apparatus, through:
(i) demodulating the received multi-level modulated signal, so as to output the multi-level signal;
(ii) performing first exclusive OR operations between a first random number and remaining random numbers of the multi-level sequence composed of a combination of values of the generated random numbers generated in the receiving apparatus, so as to output a multi-level code sequence in which the first random number is set as a lowest order bit and resultants of the first exclusive OR operations are set as remaining order bits; and (iii) performing a D/A conversion of the multi-level code sequence, performing binary decision of the multi-level signal to be inputted using a result of the D/A conversion as a decision level, performing a second exclusive OR operation between a bit of the multi-level code sequence and a resultant of the binary decision, and outputting a resultant of the second exclusive OR operation as the information data, wherein a plurality of levels of the multi-level modulated signal is in a predetermined range of an amplitude or an intensity, and multi-level sequences corresponding to the plurality of levels of the multi-level modulated signal include, as values comprising respective digits thereof, all of the values of the random numbers respectively generated in the receiving apparatus by a plurality of pseudo random number generators.

17. A data communication method for performing secret communication between a transmitting apparatus and a receiving apparatus by using predetermined key information, the data communication method comprising, in the transmitting apparatus, the steps of:
generating a plurality of random numbers, each generated random number of the plurality of generated random numbers being a multi-level pseudo random number, a number of multi levels of each generated random number being $2^m$, and each generated random number being generated using the predetermined key information;

selecting, from among multi levels previously prepared through:
(i) performing modulo operations of (a) performing adding or subtracting operations between a first random number and second to Nth random numbers of a multi-level sequence composed of a combination of values of parallel signals of the generated random numbers and (b) performing division of resultants of the adding or the subtracting by $2^m$, so as to obtain remainders, and outputting a multi-level code sequence of a parallel signal, of the parallel signals, in which the first random number is set as a low-order m bit and resultants of the modulo operations are set as upper order bits;
(ii) performing an exclusive OR operation between information data and a bit of the multi-level code sequence, performing a D/A conversion in which a resultant of the exclusive OR operation is inputted as a highest order bit and the multi-level code sequence is inputted as remaining order bits, and outputting the D/A conversion result as a multi-level signal; and
(iii) modulating the multi-level signal to generate a multi-level modulated signal, a level corresponding to the information data and the multi-level sequence composed of the combination of values of the plurality of generated random numbers; and generating, by using the selected level, a multi-level modulate signal including a noise having a predetermined noise level, and transmitting the generated multi-level modulated signal including the noise, and in the receiving apparatus, the steps of:
generating a plurality of random numbers, each random number of the plurality of generated random numbers generated in the receiving apparatus being a multi-level pseudo random number, and each random number generated in the receiving apparatus being generated using the predetermined key information; and demodulating and reproducing the information data in accordance with a received multi-level modulated signal transmitted from the transmitting apparatus and a multi-level sequence composed of a combination of values of the random numbers generated in the receiving apparatus, wherein a plurality of levels of the multi-level modulated signal is in a predetermined range of an amplitude or an intensity, and multi-level sequences corresponding to the plurality of levels of the multi-level modulated signal include, as values comprising respective digits thereof, all of the values of the random numbers respectively generated in the receiving apparatus by a plurality of pseudo random number generators.

18. A data communication method for performing secret communication between a transmitting apparatus and a receiving apparatus by using predetermined key information, the data communication method comprising, in the transmitting apparatus, the steps of:
generating a plurality of random numbers, each generated random number of the plurality of generated random numbers being a multi-level pseudo random number, a number of multi levels of each generated random number being $2^m$, and each generated random number being generated using the predetermined key information; and selecting, from among multi levels previously prepared through:
(i) performing first exclusive OR operations between a first random number and second to Nth random numbers of a multi-level sequence composed of a combination of values of parallel signals of the generated random numbers, and outputting a multi-level code sequence in which the first random number is set as a low-order m bit and resultants of the first exclusive OR operations are set as upper order bits;
(ii) performing a second exclusive OR operation between information data and a bit of the multi-level code sequence, performing a D/A conversion in which a resultant of the second exclusive OR operation is inputted as a highest order bit and the multi-level code sequence is inputted as remaining order bits, and outputting the D/A conversion result as a multi-level signal; and
(iii) modulating the multi-level signal to generate a multi-level modulated signal, a level corresponding to the information data and the multi-level sequence composed of a combination of values of the generated random numbers; and generating, by using the selected level, a multi-level modulated signal including a noise having a predetermined noise level, and transmitting the generated multi-level modulated signal including the noise, and in the receiving apparatus, the steps of:
generating a plurality of random numbers, each random number of the plurality of generated random numbers generated in the receiving apparatus being a multi-level pseudo random number, and each random number generated in the receiving apparatus being generated using the predetermined key information; and demodulating and reproducing the information data in accordance with a received multi-level modulated signal transmitted from the transmitting apparatus and a multi-level sequence composed of a combination of values of the random numbers generated in the receiving apparatus, wherein a plurality of levels of the multi-level modulated signal is in a predetermined range of an amplitude or an intensity, and multi-level sequences corresponding to the plurality of levels of the multi-level modulated signal include, as values comprising respective digits thereof, all of the values of the random numbers respectively generated in the receiving apparatus by a plurality of pseudo random number generators.

19. A data communication method for performing secret communication between a transmitting apparatus and a receiving apparatus by using predetermined key information, the data communication method comprising, in the transmitting apparatus, the steps of:
generating a plurality of random numbers, each generated random number of the plurality of generated random numbers being a multi-level pseudo random number, and each generated random number being generated using the predetermined key information;
selecting, from among multi levels previously prepared, a level corresponding to information data and a multi-level sequence composed of a combination of values of the plurality of generated random numbers; and
generating, by using the selected level, a multi-level modulated signal including a noise having a predetermined noise level, and transmitting the generated multi-level modulated signal, and in the receiving apparatus, the steps of:
generating a plurality of random numbers, each generated random number of the plurality of generated random numbers generated in the receiving apparatus being a multi-level pseudo random number, a number of multi levels of each generated random number generated in the receiving apparatus being $2^m$, and each generated random number generated in the receiving apparatus being generated using the predetermined key information; and demodulating and reproducing the information data in accordance with a received multi-level modulated signal transmitted from the transmitting apparatus and a multi-level sequence composed of a combination of values of the random numbers generated in the receiving apparatus, through:

(i) demodulating the received multi-level modulated signal, so as to output a multi-level signal;

(ii) performing modulo operations of (a) performing adding or subtracting operations between a first random number and second to Nth random numbers of the multi-level sequence composed of a combination of values of parallel signals of the random numbers generated in the receiving apparatus and (b) performing division of resultants of the adding or the subtracting by $2^m$, so as to obtain remainders, and outputting a multi-level code sequence of a parallel signal, of the parallel signals, in which the first random number is set as a low-order m bit and resultants of the modulo operations are set as upper order bits; and (iii) performing a binary decision of the multi-level signal using a result of a D/A conversion of the multi-level code sequence as a decision level, performing an exclusive OR operation between a bit of the multi-level code sequence and a resultant of the binary decision, and outputting a resultant of the exclusive OR operation as the information data, wherein a plurality of levels of the multi-level modulated signal is in a predetermined range of an amplitude or an intensity, and multi-level sequences corresponding to the plurality of levels of the multi-level modulated signal include, as values comprising respective digits thereof, all of the values of the random numbers respectively generated in the receiving apparatus by a plurality of pseudo random number generators.

\* \* \* \* \*